(12) United States Patent
Chen et al.

(10) Patent No.: US 11,544,059 B2
(45) Date of Patent: Jan. 3, 2023

(54) SIGNAL PROCESSING DEVICE, SIGNAL PROCESSING METHOD AND RELATED PRODUCTS

(71) Applicant: Cambricon (Xi'an) Semiconductor Co., Ltd., Xi'an (CN)

(72) Inventors: Tianshi Chen, Shanghai (CN); Shuai Hu, Shanghai (CN)

(73) Assignee: Cambricon (Xi'an) Semiconductor Co., Ltd., Xi'an (CN)

(*) Notice: Subject to any disclaimer, the term of this patent is extended or adjusted under 35 U.S.C. 154(b) by 293 days.

(21) Appl. No.: 16/706,918

(22) Filed: Dec. 9, 2019

(65) Prior Publication Data
US 2020/0241874 A1 Jul. 30, 2020

(30) Foreign Application Priority Data
Dec. 28, 2018 (CN) .......................... 201811633002.9

(51) Int. Cl.
*G06K 9/00* (2022.01)
*G06F 9/30* (2018.01)
(Continued)

(52) U.S. Cl.
CPC ........ *G06F 9/30025* (2013.01); *G06F 40/274* (2020.01); *G06N 3/063* (2013.01);
(Continued)

(58) Field of Classification Search
CPC ............... G06F 9/30025; G06F 40/274; G06F 3/04845; G06F 40/30; G06N 3/063;
(Continued)

(56) References Cited

U.S. PATENT DOCUMENTS

| 5,052,043 A | 9/1991 | Gaborski |
| 6,144,977 A | 11/2000 | Giangarra et al. |

(Continued)

FOREIGN PATENT DOCUMENTS

| CN | 1503858 A | 6/2004 |
| CN | 1503958 A | 6/2004 |

(Continued)

OTHER PUBLICATIONS

A Framework for Algorithm Deployment on Cloud-based Quantum Computers; arxiv.org, Cornell University Library, 201 Olin Library Cornell University Ithaca, NY 14853, Dated Oct. 24, 2018; pp. 1-10.

(Continued)

*Primary Examiner* — Dhaval V Patel
(74) *Attorney, Agent, or Firm* — Rimon PC

(57) ABSTRACT

The present disclosure provides a signal processing device that includes: a signal collector configured to obtain an image to be processed, a signal collector configured to collect an input signal, an instruction converter configured to convert the signal into an image processing instruction according to a target signal instruction conversion model, an image processor configured to edit the image to be processed according to the image processing instruction and a target image processing model to obtain a result image. Examples taught in the present disclosure implements a user command to process images, which saves users' time spent in learning image processing software prior to image processing and improves user experience.

22 Claims, 20 Drawing Sheets

(51) Int. Cl.
*G06F 40/274* (2020.01)
*G06N 20/00* (2019.01)
*G06N 3/08* (2006.01)
*G06N 3/063* (2006.01)
*G06T 11/60* (2006.01)

(52) U.S. Cl.
CPC .............. *G06N 3/08* (2013.01); *G06N 20/00* (2019.01); *G06T 11/60* (2013.01)

(58) Field of Classification Search
CPC ........ G06N 3/08; G06N 20/00; G06N 3/0481; G06N 3/084; G06N 5/003; G06N 7/005; G06N 20/10; G06N 3/04; G06T 11/60; G10L 15/22; G10L 2015/223; H04N 5/23229; H04N 5/14; H04N 5/262
See application file for complete search history.

(56) References Cited

U.S. PATENT DOCUMENTS

| | | |
|---|---|---|
| 6,671,796 B1 | 12/2003 | Sudharsanan et al. |
| 6,715,065 B1 | 3/2004 | Ebata et al. |
| 6,931,639 B1 | 8/2005 | Eickemeyer |
| 7,236,995 B2 | 6/2007 | Hinds |
| 7,242,414 B1 | 7/2007 | Thekkath et al. |
| 7,406,451 B2 | 7/2008 | Mrziglod et al. |
| 7,721,128 B2 | 5/2010 | Johns et al. |
| 7,945,607 B2 | 5/2011 | Hinds |
| 8,051,117 B2 | 11/2011 | Lundvall et al. |
| 8,190,664 B2 | 5/2012 | Lundvall et al. |
| 8,560,591 B2 | 10/2013 | Lundvall et al. |
| 8,694,572 B2 | 4/2014 | Samy et al. |
| 8,762,438 B2 | 6/2014 | Lundvall et al. |
| 8,924,455 B1 | 12/2014 | Barman et al. |
| 9,412,366 B2 | 8/2016 | Wilkensky et al. |
| 10,187,568 B1 | 1/2019 | Tran et al. |
| 10,224,954 B1 | 3/2019 | Madduri et al. |
| 10,360,304 B1 | 7/2019 | Alvarez et al. |
| 10,427,306 B1 | 10/2019 | Quinlan et al. |
| 10,656,942 B2 | 5/2020 | Madduri et al. |
| 10,929,744 B2 | 2/2021 | Li et al. |
| 2002/0138714 A1 | 9/2002 | Leibholz et al. |
| 2003/0167460 A1 | 9/2003 | Desai et al. |
| 2005/0138327 A1 | 6/2005 | Tabei |
| 2006/0161375 A1 | 7/2006 | Duberstein et al. |
| 2007/0220076 A1 | 9/2007 | Hinds |
| 2008/0148120 A1 | 6/2008 | Seuring |
| 2009/0113186 A1 | 4/2009 | Kato et al. |
| 2009/0125293 A1 | 5/2009 | Lefurgy et al. |
| 2010/0073068 A1 | 3/2010 | Cho et al. |
| 2011/0060587 A1 | 3/2011 | Phillips et al. |
| 2011/0301777 A1 | 12/2011 | Cox et al. |
| 2012/0316845 A1 | 12/2012 | Grey et al. |
| 2013/0054110 A1 | 2/2013 | Sata |
| 2013/0332610 A1 | 12/2013 | Beveridge |
| 2014/0081625 A1* | 3/2014 | Wilensky ................ G06F 40/30 704/275 |
| 2014/0164737 A1 | 6/2014 | Collange et al. |
| 2014/0249814 A1 | 9/2014 | Nakano et al. |
| 2015/0134581 A1 | 5/2015 | Doeding et al. |
| 2015/0370303 A1 | 12/2015 | Krishnaswamy et al. |
| 2016/0026231 A1 | 1/2016 | Ignowski et al. |
| 2016/0054922 A1 | 2/2016 | Awasthi et al. |
| 2016/0124710 A1 | 5/2016 | Lutz et al. |
| 2016/0170866 A1 | 6/2016 | Ioualalen et al. |
| 2016/0328645 A1 | 11/2016 | Lin et al. |
| 2017/0061279 A1 | 3/2017 | Yang et al. |
| 2017/0090956 A1 | 3/2017 | Linsky |
| 2017/0103022 A1 | 4/2017 | Kreinin et al. |
| 2017/0142327 A1 | 5/2017 | Bayani |
| 2017/0161604 A1 | 6/2017 | Craddock et al. |
| 2017/0221176 A1 | 8/2017 | Munteanu et al. |
| 2017/0257079 A1 | 9/2017 | Jain et al. |
| 2017/0262959 A1* | 9/2017 | Lee ..................... G06Q 30/0621 |
| 2017/0316307 A1 | 11/2017 | Koster et al. |
| 2017/0316312 A1 | 11/2017 | Goyal et al. |
| 2017/0344882 A1 | 11/2017 | Ambrose et al. |
| 2017/0353163 A1 | 12/2017 | Gazneli et al. |
| 2017/0357530 A1 | 12/2017 | Shih et al. |
| 2017/0357910 A1 | 12/2017 | Sommer et al. |
| 2018/0046903 A1 | 2/2018 | Yao et al. |
| 2018/0088996 A1 | 3/2018 | Rossi et al. |
| 2018/0096243 A1 | 4/2018 | Patil et al. |
| 2018/0157464 A1 | 6/2018 | Lutz et al. |
| 2018/0288440 A1 | 10/2018 | Chao |
| 2018/0293517 A1 | 10/2018 | Browne et al. |
| 2018/0300931 A1 | 10/2018 | Vembu et al. |
| 2018/0322391 A1 | 11/2018 | Wu et al. |
| 2018/0357541 A1 | 12/2018 | Chen et al. |
| 2018/0367729 A1* | 12/2018 | Parasnis ............. H04N 5/23232 |
| 2018/0373976 A1 | 12/2018 | Woo |
| 2019/0034784 A1 | 1/2019 | Li et al. |
| 2019/0042925 A1 | 2/2019 | Choe et al. |
| 2019/0050710 A1 | 2/2019 | Wang et al. |
| 2019/0057696 A1 | 2/2019 | Ogawa |
| 2019/0102229 A1* | 4/2019 | Gupta ................... G06F 9/5027 |
| 2019/0114142 A1 | 4/2019 | Yoda et al. |
| 2019/0122094 A1 | 4/2019 | Chen et al. |
| 2019/0122119 A1 | 4/2019 | Husain |
| 2019/0138372 A1 | 5/2019 | Tee |
| 2019/0164285 A1 | 5/2019 | Nye et al. |
| 2019/0180170 A1 | 6/2019 | Huang et al. |
| 2019/0199370 A1 | 6/2019 | Madduri et al. |
| 2019/0205737 A1 | 7/2019 | Bleiweiss et al. |
| 2019/0205746 A1 | 7/2019 | Nurvitadhi et al. |
| 2019/0220734 A1 | 7/2019 | Ferdman et al. |
| 2019/0228762 A1 | 7/2019 | Wang et al. |
| 2019/0251429 A1 | 8/2019 | Du et al. |
| 2019/0265949 A1 | 8/2019 | Ito |
| 2019/0278677 A1 | 9/2019 | Terechko et al. |
| 2019/0294968 A1 | 9/2019 | Vantrease et al. |
| 2020/0005424 A1 | 1/2020 | Appu et al. |
| 2020/0097799 A1 | 3/2020 | Divakar et al. |
| 2020/0117453 A1 | 4/2020 | Zhang et al. |
| 2020/0117614 A1 | 4/2020 | Zhang et al. |
| 2020/0125508 A1 | 4/2020 | Liu et al. |
| 2020/0126554 A1 | 4/2020 | Chen et al. |
| 2020/0126555 A1 | 4/2020 | Chen et al. |
| 2020/0135171 A1* | 4/2020 | Tachibana ............... G10L 13/02 |
| 2020/0142748 A1 | 5/2020 | Liu et al. |
| 2020/0159527 A1 | 5/2020 | Zhang et al. |
| 2020/0159530 A1 | 5/2020 | Zhang et al. |
| 2020/0159531 A1 | 5/2020 | Zhang et al. |
| 2020/0159532 A1 | 5/2020 | Zhang et al. |
| 2020/0159533 A1 | 5/2020 | Zhang et al. |
| 2020/0159534 A1 | 5/2020 | Li et al. |
| 2020/0160162 A1 | 5/2020 | Zhang et al. |
| 2020/0160163 A1 | 5/2020 | Liu et al. |
| 2020/0160219 A1 | 5/2020 | Zhang et al. |
| 2020/0160220 A1 | 5/2020 | Zhang et al. |
| 2020/0160221 A1 | 5/2020 | Zhang et al. |
| 2020/0160222 A1 | 5/2020 | Zhang et al. |
| 2020/0168227 A1 | 5/2020 | Chen et al. |
| 2020/0174547 A1 | 6/2020 | Fang et al. |
| 2020/0183752 A1 | 6/2020 | Liu et al. |
| 2020/0241874 A1 | 7/2020 | Chen et al. |
| 2020/0257972 A1 | 8/2020 | Miniskar et al. |
| 2020/0334041 A1 | 10/2020 | Zhang et al. |
| 2020/0334522 A1 | 10/2020 | Zhang et al. |
| 2020/0334572 A1 | 10/2020 | Zhang et al. |
| 2020/0394522 A1 | 12/2020 | Liu et al. |
| 2020/0394523 A1 | 12/2020 | Liu et al. |
| 2021/0042889 A1 | 2/2021 | Pei |
| 2021/0061028 A1 | 3/2021 | Da Deppo et al. |
| 2021/0117768 A1 | 4/2021 | Liu et al. |
| 2021/0117810 A1 | 4/2021 | Liu |
| 2021/0182177 A1 | 6/2021 | Su et al. |
| 2021/0264270 A1 | 8/2021 | Liu et al. |
| 2021/0334007 A1 | 10/2021 | Liu et al. |
| 2021/0334137 A1 | 10/2021 | Zhang et al. |
| 2021/0341989 A1 | 11/2021 | Chen et al. |

(56) References Cited

U.S. PATENT DOCUMENTS

2021/0374510 A1 12/2021 Liu et al.
2021/0374511 A1 12/2021 Liu et al.

FOREIGN PATENT DOCUMENTS

| | | | |
|---|---|---|---|
| CN | 1851668 A | 10/2006 | |
| CN | 101572829 A | 11/2009 | |
| CN | 102270042 A | 12/2011 | |
| CN | 102404673 A | 4/2012 | |
| CN | 102684701 A | 9/2012 | |
| CN | 102761509 A | 10/2012 | |
| CN | 102789413 A | 11/2012 | |
| CN | 102903089 A | 1/2013 | |
| CN | 102981854 A | 3/2013 | |
| CN | 103152673 A | 6/2013 | |
| CN | 104914977 A | 9/2015 | |
| CN | 105389158 A | 3/2016 | |
| CN | 103534664 A | 8/2016 | |
| CN | 105893419 A | 8/2016 | |
| CN | 105978611 A | 9/2016 | |
| CN | 106156310 A | 11/2016 | |
| CN | 106354568 A | 1/2017 | |
| CN | 106406812 A | 2/2017 | |
| CN | 106469291 A | 3/2017 | |
| CN | 106485316 A | 3/2017 | |
| CN | 106502626 A | 3/2017 | |
| CN | 106570559 A | 4/2017 | |
| CN | 106650922 A | 5/2017 | |
| CN | 106814639 A | 6/2017 | |
| CN | 106951587 A | 7/2017 | |
| CN | 106951962 A1 | 7/2017 | |
| CN | 106997236 A | 8/2017 | |
| CN | 107003988 A | 8/2017 | |
| CN | 107025629 A | 8/2017 | |
| CN | 107368174 A | 11/2017 | |
| CN | 107451654 A | 12/2017 | |
| CN | 107451658 A | 12/2017 | |
| CN | 107608715 A | 1/2018 | |
| CN | 107644254 A | 1/2018 | |
| CN | 107688855 A | 2/2018 | |
| CN | 107797913 A | 3/2018 | |
| CN | 108053028 A | 5/2018 | |
| CN | 104899641 A | 7/2018 | |
| CN | 108337000 A | 7/2018 | |
| CN | 108510067 A | 9/2018 | |
| CN | 108717570 A | 10/2018 | |
| CN | 109062540 A | 12/2018 | |
| CN | 109063820 A | 12/2018 | |
| CN | 109902745 A | 6/2019 | |
| CN | 109934331 A | 6/2019 | |
| CN | 109993296 A | 7/2019 | |
| CN | 110059733 A | 7/2019 | |
| CN | 11055450 A | 12/2019 | |
| CN | 110780845 A | 2/2020 | |
| EP | 0 789 296 A1 | 8/1997 | |
| EP | 2 703 945 A2 | 3/2014 | |
| EP | 3 106 997 A2 | 12/2016 | |
| EP | 3 407 268 A1 | 11/2018 | |
| JP | H03-075860 A | 8/1989 | |
| JP | H09-265379 A | 10/1997 | |
| JP | 2009-134433 A | 8/2012 | |
| JP | 2013-514570 A | 4/2013 | |
| JP | 2014-199464 A | 10/2014 | |
| JP | 2013514570 A | 4/2015 | |
| JP | 2015-176158 A | 10/2015 | |
| JP | 2018-26114 A | 2/2018 | |
| JP | 2019-519852 A | 7/2019 | |
| WO | 2008153194 A1 | 12/2008 | |
| WO | 2014199464 A1 | 12/2014 | |
| WO | 2016186823 A1 | 11/2016 | |
| WO | 2017138220 A1 | 8/2017 | |
| WO | 2017185412 A1 | 11/2017 | |
| WO | WO-2018159403 A1 * | 9/2018 | ............ G10L 13/02 |

OTHER PUBLICATIONS

Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen, T., et al., "A Small-Footprint Accelerator for Large-Scale Neural Networks," ACM Transactions on Computer Systems (TOCS), vol. 33, Issue 2, May 1, 2015, Article No. 6, ACM New York, NY, USA; available: https://dl.acm.org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66 , Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems,pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36 , Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.

Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

Vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI : 10.1109/JPROC.2017.2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA.2016.42 ISBN: 978-0-7695-3174-8 [retrieved on Aug. 24, 2016].

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc.2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), XP055673941, Retrieved from the Internet: URL:https://tigerprints.clemson.edu/cgi/viewcontent.cgi? article=1634&context=all theses retrieved on Mar. 5, 2020].

(56) References Cited

OTHER PUBLICATIONS

European Patent Office, Extended European Search Report for European Application No. 19212749.6 dated Mar. 18, 2020.
European Patent Office, Extended European Search Report for European Application No. 19212750.4 dated Mar. 18, 2020.
European Patent Office, Extended European Search Report for European Application No. 19212751.2 dated Mar. 18, 2020.
European Patent Office, Extended European Search Report for European Application No. 19212752.0 dated Mar. 18, 2020.
European Patent Office, Extended European Search Report for European Application No. 19214004.4 dated Mar. 18, 2020.
European Patent Office, Extended European Search Report for European Application No. 19213389.0 dated Mar. 18, 2020.
European Patent Office, Extended European Search Report for European Application No. 19212753.8 dated Mar. 18, 2020.
European Patent Office, Extended European Search Report for European Application No. 19212754.6 dated Mar. 18, 2020.
European Patent Office, Extended European Search Report for European Application No. 19212755.3 dated Mar. 18, 2020.
European Patent Office, Extended European Search Report for European Application No. 19212756.1 dated Mar. 18, 2020.
European Patent Office, Extended European Search Report for European Application No. 18906652.6 dated Mar. 18, 2020.
European Patent Office, Extended European Search Report for European Application No. 19212746.2 dated Mar. 18, 2020.
Kalathingal Sajith et al., "Dynamic Inter-Thread Vectorization Architecture: Extracting OLP from TLP", 2016 28th International Symposium on Computer Architecture and High Performance Computing (SBAC—PAD), IEEE, Oct. 26, 2016, pp. 18-25, XP033028005, DOI: 10.1109/SBAC-PAD.2016.11.
Li et al., "Using Artificial Neural Network for Predicting Thread Partitioning in Speculative Multithreading", IEEE, 2015, pp. 823-826.
Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.
Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.
Anonymous, "Control unit—Wikipedia", May 8, 2017 (May 8, 2017), XP055673879,Retrieved from the Internet: URL: https://web.archive.org/web/20170508110348/https://en.wikipedia org/ wiki/ Control unit [retrieved on Mar. 5, 2020].
Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/2017/031Tutorial-on- JNN-4-of-5-DNN-Accelerator-Architectures.pdf [retrieved on Mar. 2, 2020].
Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].
Pedro O. Domingos, et al., "An Efficient and Scalable Architecture for Neural Networks With Backpropagation Learning" Proceedings/ 2005 International Conference on Field Programmable Logic and Applications {FPL): Tampere Hall, Tampere, Finland, Jan. 1, 2005, pp. 89-94, XP055606447, Piscataway, NJ. DOI: 10.1109/FPL.2005.1515704 ISBN: 978-0-7803-9362-2.
Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].
Song Mingcong et al., "In-Situ AI: Towards Autonomous and Incremental Deep Learning for IoT Systems", 2018 IEEE International Symposium on High Performance Computer Architecture (HPCA),IEEE, Feb. 24, 2018 (Feb. 24, 2018), pp. 92-103, XP033341941, DOI: 10.1109/HPCA.2018.00018 [retrieved on Mar. 27, 2018].
Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].
Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].
European Patent Office, extended European search report for Application No. 19216754.2 dated May 8, 2020.
Extended European Search Report for EP Application No. 19214324.6 dated Oct. 1, 2020.
International Searching Authority, International Search Report for PCT Application No. PCT/CN2019/093144 dated Oct. 9, 2019.
Extended European Search Report for Application No. 19215861.6 dated May 15, 2020.
Extended European Search Report for Application No. 19215862.4 dated May 15, 2020.
Sumina Yamashita, et al., "A Method to create illustrate images using DCGAN," JISJ SIG Technical Report, vol. 2017-MPS-112 No. 16, Feb. 27, 2017; translation of abstract included.

* cited by examiner

SIGNAL PROCESSING DEVICE, SIGNAL PROCESSING METHOD AND RELATED PRODUCTS

RELATED APPLICATIONS

This claims the benefit of priority from Chinese Application No. 201811633002.9, filed Dec. 28, 2018, the disclosures of which is incorporated herein by reference in its entirety.

TECHNICAL FIELD

The present disclosure relates to the field of image processing, and particularly relates to a signal processing device, a signal processing method, and related products.

BACKGROUND

After taking photos, users tend to process the images by using Photoshop in an electronic device (such as a mobile phone or a tablet computer) or photo retouch software in a mobile phone to display better images.

However, prior to using Photoshop in the electronic device or the photo retouch software in the mobile phone to process images, users need to learn how to use the software and then input instructions manually to control an electronic device to perform retouch operations. This process is time-consuming for users and leads to unsatisfactory user experience.

SUMMARY

Examples of the present disclosure provide a signal processing device, a signal processing method, and related products, which may realize a function of inputting a signal to process images. Therefore, users' time spent in learning image processing software prior to image processing can be saved, and user experience can be improved.

In a first aspect, examples of the present disclosure provides a signal processing device, including:

a signal collector configured to obtain an image to be processed, where the signal collector is further configured to collect an input signal;

an instruction converter configured to convert the signal into an image processing instruction according to a target signal instruction conversion model; and an image processor configured to edit the image to be processed according to the image processing instruction and a target image processing model to obtain a result image.

In a second aspect, examples of the present disclosure further provide a machine learning operation device, which includes one or more signal processing devices of the first aspect. The machine learning operation device is configured to obtain input data and control information from other processing devices, execute a specified machine learning operation, and send an execution result to other processing devices through I/O interfaces.

When the machine learning operation device includes a plurality of the signal processing devices, the plurality of the signal processing devices may be connected and transfer data through a specific structure.

The plurality of the signal processing devices are interconnected and transfer data through a peripheral component interconnect express (PCIE) bus to support larger-scale machine learning operations. The plurality of the signal processing devices share a same control system or have respective control systems, share a memory or have respective memories, and are interconnected in a manner of arbitrary interconnection topology.

In a third aspect, examples of the present disclosure provide a combined processing device, where the combined processing device includes the machine learning operation device of the second aspect, a universal interconnection interface, and other processing devices; where the machine learning operation device interacts with the other processing devices to jointly complete a computing operation designated by users.

In a fourth aspect, examples of the present disclosure further provide a neural network chip which includes the machine learning operation device of the second aspect or the combined processing device of the third aspect.

In a fifth aspect, examples of the present disclosure provide an electronic device which includes the chip of the fourth aspect.

In a sixth aspect, examples of the present disclosure provide a board card, which includes: a storage device, an interface device, a control device, and the neural network chip of the sixth aspect; where the neural network chip is connected to the storage device, the control device, and the interface device respectively;

the storage device is configured to store data;

the interface device is configured to transfer data between the chip and an external device; and the control device is configured to monitor a state of the chip.

In a seventh aspect, examples of the present disclosure provide a signal processing method, which includes:

obtaining an image to be processed;

collecting an input signal;

converting the signal into an image processing instruction according to a target signal instruction conversion model; and editing the image to be processed according to the image processing instruction and the target image processing model to obtain a result image.

In an eighth aspect, examples of the present disclosure provide a computer readable storage medium, on which a computer program for electronic data exchange is stored. The computer program enables a computer to execute some or all of the steps described in the seventh aspect of the present disclosure.

In a ninth aspect, examples of the present disclosure provide a computer program product, which includes a non-volatile computer readable storage medium storing a computer program. The computer program enables a computer to execute some or all of the steps described in the seventh aspect of the present disclosure. The computer program product may be a software installation package.

It can be seen that, in the solution of examples of the present disclosure, the signal collector obtains an image to be processed and collects an input signal. The instruction converter converts the signal into an image processing instruction according to a target signal instruction conversion model. The image processing instruction and the target image processing model edit the image to be processed to obtain a result image. Compared with existing image processing technologies, the present disclosure performs image processing by using an input signal, which saves users' time spent in learning image processing software prior to image processing, and improves user experience.

The above aspects or other aspects of the present disclosure will be more concise and easier to understand in descriptions of following examples.

BRIEF DESCRIPTION OF THE DRAWINGS

To describe technical solutions in examples of the present disclosure more clearly, accompanied drawings needed in the examples of the present disclosure will be briefly described hereinafter. Apparently, the described accompanied drawings below are some examples of the present disclosure. Those of ordinary skill in the art may obtain other accompanied drawings based on the accompanied drawings without creative efforts.

DETAILED DESCRIPTION OF EXAMPLES

Technical solutions in the examples will be described in detail hereinafter

The terms such as "first", "second", "third", "fourth" and the like configured in the specification, the claims, and the accompanied drawings of the present disclosure are configured for distinguishing between different objects rather than describing a particular order. The terms "include" and "comprise" as well as variations thereof are intended to cover non-exclusive inclusion. For instance, a process or a method including a series of steps or a system, a product, a device, or an device including a series of units is not limited to the listed steps or units, it may alternatively include other steps or units that are not listed; alternatively, other steps or units inherent to the process, method, product, or device may be included.

The term "example" or "implementation" referred to herein means that a particular feature, structure, or characteristic described in conjunction with the example may be contained in at least one example of the present disclosure. The phrase appearing in various places in the specification does not necessarily refer to the same example, nor does it refer to an independent or alternative example that is mutually exclusive with other examples. It is expressly and implicitly understood by those skilled in the art that an example described herein may be combined with other examples.

In some examples, an electronic device provided in the present disclosure may include at least one type of: a robot, a computer, a printer, a scanner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device.

The transportation means includes an airplane, a ship, and/or a vehicle. The household electrical appliance includes a television, an air conditioner, a microwave oven, a refrigerator, an electric rice cooker, a humidifier, a washing machine, an electric lamp, a gas cooker, and a range hood. The medical device includes a nuclear magnetic resonance spectrometer, a B-ultrasonic scanner, and/or an electrocardiograph.

Figure 1:
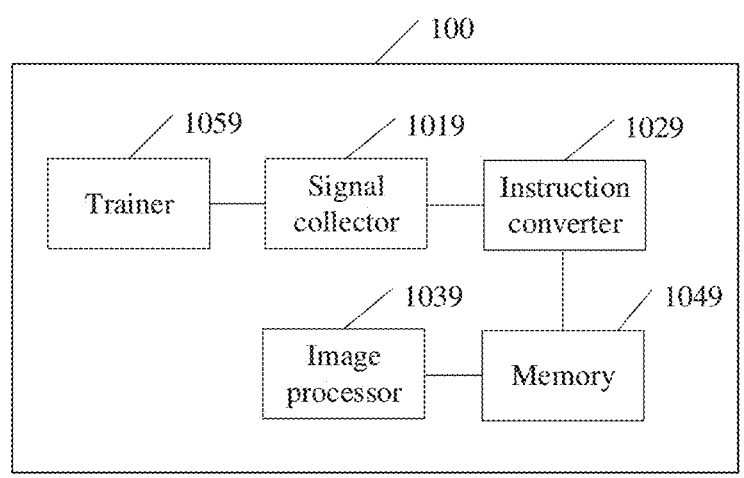
FIG. 1 is a structural diagram of a signal processing device according to an example of the present disclosure.

FIG. 1 is a structural diagram of a signal processing device according to an example of the present disclosure. As shown in FIG. 1, a signal processing device 100 includes:

a signal collector 1019 configured to obtain an image to be processed;

where the signal processing device may be applied to an electronic device

Optionally, the signal processing device further includes a memory, and the image to be processed refers to content captured in real time by an image collecting device, or refers to at least one frame of an image or a video stored in the memory.

The image to be processed may be content captured in real time by an image collecting device of an electronic device, or may be any one or more frames of previously stored or cached images or videos read from an album or a memory. The cached image may be a preview image, or the image collecting device may be a camera, an ultrasonic sensor, or other image collecting devices. The content may include human behavior, human expressions, objects, scenes, and the like. The camera may be an infrared camera, a visible light camera, a depth-of-field camera, and the like, which is not limited herein.

The signal collector 1019 may be further configured to collect an input signal.

The signal includes, but is not limited to, a voice signal, an image signal, a text signal, and a sensor signal. The signal collecting device may collect only one of the signals or collect a plurality of the signals. For instance, the sensor signal may be a touch signal, which refers to a signal generated by touching a touch screen; or the signal may be a voice signal, which refers to a voice signal received through a microphone; or the signal may be an image signal, which refers to a signal generated by an obtained image; or the signal may be a gesture signal, which refers to a signal generated by collecting users' gesture. The above signal includes instruction information which instructs an electronic device to edit an image to be processed.

Optionally, the touch signal may be parsed into a touch parameter. The touch parameter may be at least one of the following: the number of touches, a touch area, touch force, the number of touch points, a touch position, a touch track, a touch pattern, and the like, which is not limited herein. The number of touches may be understood as the number of times a touch screen is touched within a specified period of time. The specified period of time may be set by users or defaulted by a system. The touch area may be an area of a touch screen touched by a finger. The touch force may be the force with which a finger touches a touch screen, and the number of touch points may be the number of fingers on a touch screen detected by a touch screen. Specifically, for multi-touch, the touch position may be a physical position where a touch screen is touched, or be a position of a preset pattern in a display interface of a touch screen. The preset pattern may be set by users or defaulted by a system. In this case, the touch position may be a dynamic position, and the touch track may be a touch track detected by a touch screen. Similarly, the touch pattern may be a touch pattern detected by a touch screen.

Furthermore, when the signal is a touch signal, in terms of converting the signal into an image processing instruction according to a target signal instruction conversion model, the instruction converter may be specifically configured to:

parse the signal into a target touch parameter; and determine an image processing instruction corresponding to the target touch parameter according to a preset mapping relationship between the touch parameter and the instruction.

In a specific implementation, the preset mapping relationship between the touch parameter and the instruction may be stored in the memory in advance, and the signal processing device may parse a signal into a touch parameter and determine a corresponding image processing instruction of the touch parameter according to the above mapping relationship.

An instruction converter 1029 is configured to convert the signal into an image processing instruction according to a target signal instruction conversion model. Different types of signals may correspond to different signal instruction conversion models. Furthermore, a signal is converted into an image processing instruction according to the target signal instruction conversion model.

Optionally, the image processing instruction may include at least one of the following: an image editing area, an image editing method, and an image editing mode. The image editing mode is a real-time editing model, or a single image editing mode, or a multi-image editing mode. The image processing instruction can be used to edit one or more images and a video in real time.

An image processor 1039 may be configured to edit the image to be processed according to the image processing instruction to obtain a result image.

An electronic device may edit an image according to the image processing instruction, and display an edited image to a screen of the electronic device. If the image is a frame captured in real time or a frame in a video, a subsequent image captured in real time or a subsequent frame of the video may be edited according to the signal's designation.

Furthermore, the electronic device may receive a storing instruction, and store the resulting image in response to the storing instruction.

In the examples of the present disclosure, the signal processing device may edit an image through an image processing instruction in real-time, which may quickly and effectively process users' needs for editing the image, and then feedback to users to improve user experience. In addition, a voice signal or one or more of other types of instruction signals can be used to effectively reduce complexity of users editing an image and further improve user-friendly operations.

Optionally, the signal processing device 100 may further include a signal filter. After the signal collector 101 collects the signal, the signal filter performs noise reduction processing on the input signal to reduce interference of useless data in the signal.

Optionally, the signal collector may be a voice signal collector, including but not limited to: a voice sensor, a microphone, a pickup, or other video collecting devices, which is not limited herein. The signal collector may also be an image collector, including but not limited to: a camera, a video camera, and other image collecting devices, which is not limited herein. The signal collector may also be a sensor signal collector, including but not limited to: a touch screen, a touchpad, a body sensor, an ultrasound sensor, a brain wave sensor, and other sensor signal collecting devices.

Specifically, if the signal in the step 101 is a voice signal, the signal collector 1019 may receive an environmental sound signal when receiving a voice signal. The signal filter performs noise reduction processing on the voice signal according to the environmental sound signal. For the voice signal, the environmental sound signal is noise. Furthermore, the signal collector 101 may include a microphone array configured to collect the voice signal and the environmental voice signal, and reduce noise.

Specifically, if the signal in the step 101 is an image signal, the signal collector 1019 may receive an image signal, where only part content of the image signal is valid information such as a gesture, a facial expression, and an action trend. The signal filter may be configured to filter out useless information and only extract useful information in the image, such as a gesture, a facial expression, and an action trend. Further, the image collector 101 may include a somatosensory sensor configured to extract a somatosensory action and an orientation of a person after collecting an image to locate and obtain useful information.

Specifically, if the signal in the step 101 is a text signal, the signal collector 1019 may receive a text signal, where not all content of the text signal is valid information. The text signal filter may be configured to filter out useless information and extract useful information of the text signal, such as keywords.

Optionally, in an example, the signal processing device may further include a first storage module. After the signal collector collects the signal, the signal processing device stores the signal into the first storage module.

The instruction converter 1029 is configured to convert the signal into an image processing instruction and a target area according to a target signal instruction conversion model, where the target area is a processing area of an image to be processed.

Optionally, before the instruction converter 1029 converts the signal into an image processing instruction and a target area according to according to a voice recognition technology, a natural language processing technology, and an image recognition technology, the instruction converter 1029 obtains the signal in the step 101 from the first storage module.

Figure 2:
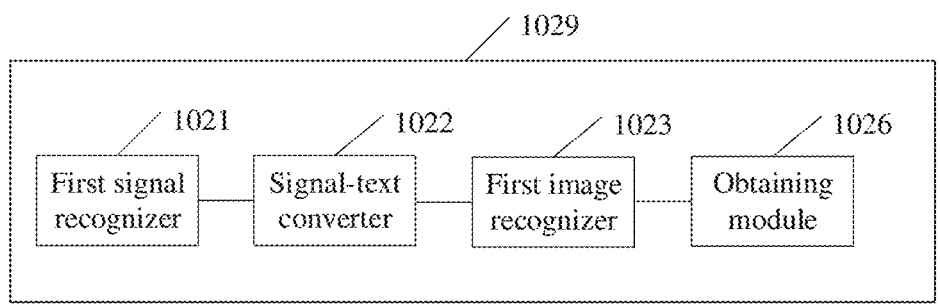
FIG. 2 is a partial structural diagram of another signal processing device according to one example of the present disclosure.

As shown in FIG. 2, the instruction converter 1029 includes:

a first signal recognizer 1021 configured to convert the signal into text information. Optionally, the recognizer may include one or more sub-recognizers, for instance, a voice signal sub-recognizer converts a voice signal into text information according to the voice recognition technology, and an image signal sub-recognizer converts a valid signal of an image or a group of images into text information through the image recognition technology, etc.

Optionally, during the process of converting the signal into text information, multiple types of signals may be processed at the same time. For instance, a voice signal and an image signal are input at the same time, then a voice signal sub-recognizer and an image signal sub-recognizer are respectively used to recognize the voice signal and the image signal.

Procedures of the image signal processing a group of images are described as follows. For instance, a camera is used to collect multiple images, and an image signal sub-recognizer is used to segment a collected image and remove invalid information, which means to segment a foreground and a background of the image and remove the background information as well as obtain the foreground information, then relevant information such as a position and a size of one or more targets can be determined. Specifically, an edge detection technology is used to determine a position and a range of a human face, a human hand, and a human skeleton structure at first; secondly, a target is recognized, and if there are multiple candidate targets, a priority of each candidate target is determined; finally, a valid target is selected, and a target tracking technology is used to track the target's motion trail to obtain a meaning expressed by the target. For instance, if the face and the skeleton structure of a person are basically unchanged while the human hand slides from left to right, the obtained valid information is to move an image editing area of the image to be processed from the left to the right, and then the valid image information is converted into a preset type of information. The preset type of information may be at least one of the following: text information, image information, voice information, projection information, vibration information, etc., which is not limited herein.

Procedures of the text signal processing a segment of text are described as follows. For instance, a text information collector is used to obtain a segment of text information, and a text signal sub-recognizer is used to segment collected text to form a text vector, and then a text feature extraction technology is used to select valid text information. Combined with a text matching model generated through offline training, the valid collected text information is converted into a preset type of information that can be sent to a signal text converter. The preset type of information can be at least one of the following: text information, image information, and voice information, projection information, vibration information, etc., which is not limited herein.

Processing procedures of the multiple signals are described as follows. For instance, if two or more signal collectors collect signals such as a voice signal and an image signal, the voice signal is processed by a voice signal sub-recognizer to be text information corresponding to the voice signal, and the image signal is processed by an image signal sub-recognizer to be a preset type of information corresponding to the image signal. The preset type of information may be at least one of the following: text information, image information, voice information, projection information, vibration information, etc., which is not limited herein.

A signal text converter 1022 is configured to convert the one or more pieces of text information into the image processing instruction through the natural language processing technology and the target signal instruction conversion model.

A first image recognizer 1023 is configured to divide the image to be processed into areas according to a granularity of a semantic area in the image processing instruction and the image recognition technology, and obtain the image editing area.

Further, the instruction converter 1029 may further include:

an obtaining module 1026 configured to obtain the granularity of the semantic area in the image processing instruction.

The semantic area is described as follows. For instance, if the signal processing device 100 determines that the image editing area is a human face area according to a voice signal, the semantic area is the human face area in the image to be processed, and the face is used as a granularity by the signal processing device to obtain multiple human face areas in the image to be processed. If the image editing area is a background, the signal processing device divides the image to be processed into a background area and a non-background area. If the image editing area is a red color area, the signal processing device divides the image to be processed into areas of different colors according to colors.

Optionally, the instruction converter 1029 may further include a determining module configured to determine whether the image editing area and the processing instruction satisfy a preset requirement of a determination model. The preset requirement may be set by users or defaulted by a system. For instance, a requirement for head-to-foot swap does not make sense. If the image editing area and the processing instruction do not satisfy a preset requirement of the determination model, prompt information is returned to users, such as asking whether users confirm to execute the operation. The determination model may be a model obtained through offline training, or be a user-defined model. If confirmation information is received, the execution continues. The method for user confirmation may include at least one of the following: clicking a button, voice input, image input, etc., which is not limited herein.

Specifically, the voice recognition technology used in the present disclosure may include but not limited to an artificial neural network (ANN), a Hidden Markov Model (HMM), and other models. The first voice recognition unit is capable of processing the voice signal according to the voice recognition technology. The natural language processing technology may include but not limited to a statistical machine learning, ANN, and other methods, and the semantic understanding unit is capable of extracting semantic information according to the natural language processing technology. The image recognition technology may include but not limited to an edge-detection-based algorithm, a threshold segmentation algorithm, an area growing and watershed algorithm, a grayscale integral projection curve analysis algorithm, a template matching algorithm, a deformable template algorithm, a Hough transform algorithm, a Snake operator algorithm, an elastic image matching technology based on Gabor wavelet transform, an active shape model, an active appearance model, and the like. The image recognition unit is capable of segmenting the image to be processed into different areas according to the image recognition technology.

In an example, the voice recognition unit 1021 converts the signal into the text information according to the voice recognition technology, the image recognition technology, and the natural language processing technology, and stores the text information into the first storage module. The semantic understanding unit 1022 obtains the text information from the first storage module, converts the text information into the image processing instruction according to the natural language processing technology and the target signal instruction conversion model, and stores the image processing instruction in the first storage module. The first image recognition unit 1023 divides the image to be processed into areas according to the granularity of the semantic area in the image processing instruction and the image recognition technology, obtains the target area, and then stores a division result and the target area into the second storage module.

Figure 3:
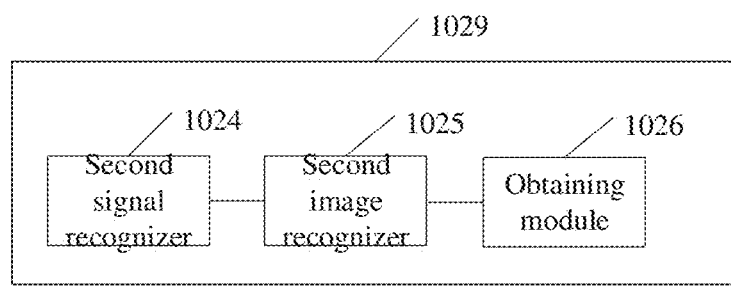
FIG. 3 is a partial structural diagram of another signal processing device according to one example of the present disclosure.

In an example, as shown in FIG. 3, the instruction converter 1029 may further include:

a second signal recognizer 1025 configured to directly convert the signal into the image processing instruction according to the voice recognition technology, the natural language processing technology, and the target signal instruction conversion model, and stores the image processing instruction into the first storage module.

Optionally, the second signal recognizer 1025 may include one or more sub-recognizers. For instance, a voice signal sub-recognizer recognizes a voice signal according to the voice recognition technology, and an image signal sub-recognizer recognizes a valid signal of an image or multiple images through the image recognition technology.

Procedures of the image signal processing a group of images are described as follows. For instance, a camera is used to collect multiple images, and an image signal sub-recognizer is used to segment a collected image and remove invalid information, which means to segment a foreground and a background of the image and remove the background information as well as obtain the foreground information, then relevant information such as a position and a size of one or more targets can be determined. Specifically, an edge detection technology is used to determine a position and a range of a human face, a human hand, and a human skeleton structure at first; secondly, a target is recognized, and if there are multiple candidate targets, a priority of each candidate target is determined; finally, a valid target is selected, and a target tracking technology is used to track the target's motion trail to obtain a meaning expressed by the target. For instance, if the face and the skeleton structure of a person are basically unchanged while the human hand slides from left to right, the obtained valid information is to move an image editing area of the image to be processed from the left to the right.

The second image recognizer 1025 divides the image to be processed according to the granularity of the semantic area of the image to be processed according to the image processing instruction to obtain an image editing area, where the image editing area is an area in which the image to be processed is processed, and further stores a division result and the image editing area into a second storage module.

Optionally, before the signal collector 1019 collects the voice signal and the image to be processed, the instruction converter 1029 may implement adaptive training on the signal instruction conversion model to obtain the target signal instruction conversion model.

The adaptive training on the signal instruction conversion model is implemented offline or online.

Specifically, the adaptive training on the signal instruction conversion model being implemented offline refers to that the instruction converter 1029 may implement adaptive training on the signal instruction conversion model on the basis of hardware of the instruction converter 1029 to obtain the target signal instruction conversion model. The adaptive training on the signal instruction conversion model being implemented online refers to that a cloud server different from the signal converter 1029 may implement adaptive training on the signal instruction conversion model to obtain the target signal instruction conversion model. When the instruction converter 1029 needs to use the target signal instruction conversion model, the instruction converter 1029 obtains the target signal instruction conversion model from the cloud server.

In an example, the adaptive training implemented on a signal instruction conversion model is supervised or unsupervised.

Specifically, the adaptive training implemented on the signal instruction conversion model being supervised refers to that:

the instruction converter 1029 converts the signal into a prediction instruction according to the signal instruction conversion model; determines a correlation coefficient between the prediction instruction and a corresponding instruction set of the prediction instruction, where the instruction set is a set of instructions obtained manually from the signals; and optimizes the signal instruction conversion model according to the correlation coefficient between the prediction instruction and the corresponding instruction set of the prediction instruction to obtain the target signal instruction conversion model.

In an example, the signal processing device 100 may further include:

a trainer 1059 configured to convert the signal into a prediction instruction according to the instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model.

For instance, the adaptive training implemented on a signal instruction conversion model being supervised may include: the instruction converter 1029 or the trainer 1059 receives a segment of voice signals containing related commands such as changing a color of an image or spinning an image. Each command corresponds to one instruction set. For the input voice signal used for adaptive training, the corresponding instruction set is known. The instruction converter 1029 or the trainer 1059 views the voice signals as the input data of the signal instruction conversion model to obtain an output prediction instruction. The instruction converter 1029 or the trainer 1059 computes the correlation coefficient between the prediction instruction and the corresponding instruction set of the prediction instruction, and adaptively updates parameters (such as weights, biases, and the like) in the signal instruction conversion model to improve performance of the signal instruction conversion model and obtain the target signal instruction conversion model.

Taking an image signal as an example, the instruction converter 1029 or the trainer 1059 receives a segment of image signals containing related commands such as specifying an object in the image through a gesture, and then requiring the object to be moved to the right. Each command corresponds to an instruction set. For the input image signal used for adaptive training, the corresponding instruction set is known. The instruction converter 1029 or the trainer 1059 takes the image signals as the input data of the signal instruction conversion model to obtain an output prediction instruction. The instruction converter 1029 or the trainer 1059 computes the correlation coefficient between the prediction instruction and the corresponding instruction set of the prediction instruction, and adaptively updates parameters (such as weights, biases, and the like) in the signal instruction conversion model to improve performance of the signal instruction conversion model and obtain the target signal instruction conversion model.

The image processing device 100 may further include:

a storage module 1049 configured to store the text information, the image processing instruction, or the image editing area.

In an example, the storage module 1049, the first storage module, and the second storage module may be identical or different storage modules.

An image processor 1039 may be configured to process the image to be processed according to the image processing instruction and the target image processing model to obtain a result image.

Figure 4:
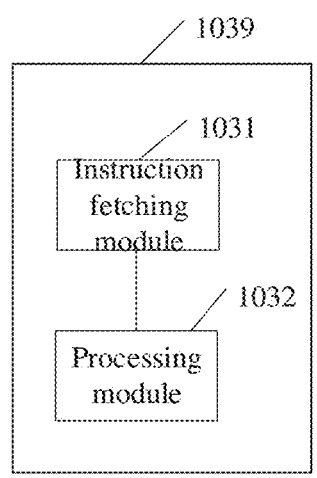
FIG. 4 is a partial structural diagram of another signal processing device according to one example of the present disclosure.

As shown in FIG. 4, the image processor 1039 may include:

an instruction fetching module 1031 configured to obtain M image processing instructions from the storage module in the preset time window, where M is an integer greater than one; and a processing module 1032 configured to process the image editing area according to the M image processing instructions and the target image processing model.

Alternatively, the processing module 1032 may be configured to:

skip or delete image processing instructions with identical functions in the M image processing instructions to obtain N image processing instructions, where N is an integer smaller than the M; and process the image editing area according to the N image processing instructions and the target image processing model.

Specifically, the preset time window may refer to a preset time period. After the instruction fetching module 1031 obtains M image processing instructions from the storage module 104 in the preset time period, the processing module 1032 compares every two of the M image processing instructions, deletes or skips instructions with identical functions from the M image processing instructions to obtain N image processing instructions. The processing module 1032 processes the image to be processed according to the N processing instructions and the target image processing model.

Examples are given to illustrate the method for the processing module 1032 comparing every two of the M image processing instructions. When an image processing instruction A and an image processing instruction B are identical, the processing module 1032 skips or deletes the one with bigger overhead in the image processing instruction A and the image processing instruction B; and when the image processing instruction A and the image processing instruction B are different, the processing module 1032 obtains a similarity coefficient between the image processing instruction A and the image processing instruction B. When the similarity coefficient is greater than a similarity threshold, it is determined that the image processing instruction A and the image processing instruction B have identical functions, and the processing module 1032 skips or deletes the one with bigger overhead in the image processing instruction A and the image processing instruction B; when the similarity coefficient is lower than the similarity threshold, the processing module 1032 determines that the image processing instruction A and B have different functions. The image processing instructions A and B refer to any two of the M processing instructions.

Specifically, both input and output of the image processor 1039 are images. The image processor 1039 may process the image to be processed by methods including but not limited to ANN and traditional computer vision-based methods, where the processing including but not limited to: body shape (such as leg sliming and breast augmentation), face change, face beautification, object change (a cat for a dog, a horse for a zebra, an apple for an orange, and the like), background change (a field for a forest), de-occlusion (such as reconstructing an occluded eye on the face), style conversion (changing into a Van Gogh style in one second), pose change (such as standing for sitting, a frontal face for a profile), changing a non-oil painting to an oil painting, changing a background color of an image and a background season of an object in the image, image synthesis, image fusion, removing an object or a shadow, image coloring, image compression, image vectorization, etc.

In an example, the image processing instruction may include a logical processing instruction, a precise processing instruction, a misty processing instruction, and other processing instructions. The image processing instruction may include at least an operation type and an operation area. The image processing instruction may further include operation data. The operation type may include at least one of the following: image recognition, image segmentation, image enhancement, image restoration, image noise reduction, background bokeh, image stitching, image integration, etc., which is not limited herein.

The logical processing instruction may be configured to process an operation requirement with a given logical meaning such as removing a football in an image. The operation of removing the football includes detecting and positioning a football area in the image, deleting the football area, and fusing the area with content around the area. The logical processing instruction may include an operation type, a logical operation area, and logical operation data.

The precise processing instruction may be configured to process an operation requirement with given precise data such as a coordinate range. For instance, in a circular area with a center point of the image as an origin and a radius as 10 pixels, a color with a RGB value as 255, 0, and 0 respectively in this area is changed. The precise processing instruction may include an operation type, a precise operation area, and precise operation data. The precise processing instruction may refer to an instruction in which an absolute position of a corresponding image is specified during operation. For instance, if a color value of a rectangle whose pixel coordinates are determined by (x1, y1) to (x2, y2) in the image is changed to white, the corresponding instruction is (CHANGECOLOR RECTANGLE 0XFFFFFF x1 y1 x2 y2).

The misty processing instruction may be configured to process an operation requirement with given misty data, such as performing an operation on an area "near a center point". The misty processing instruction may include an operation type, a misty operation area, and misty operation data. The misty processing instruction may refer to an instruction which provides an abstract representation of an operating area in the image, and an absolute position of the image needs to be determined based on the image. For instance, if a face is painted red, a corresponding instruction is (CHANGECOLOR MISTY 0XFF0000 FACE). The position domain of the instruction is the face, and specific operation coordinates need to be obtained according to a specific image.

Other processing instructions may include related operation instructions such as data input and output, data determination, etc.

The above operation types may be in the form of encoding, which is defined by a certain encoding method such as a sequential encoding method. An operation type includes, but is not limited to, movement, deletion, replacement, parameter change (such as discoloration, brightness, and contrast), shape change (reduction, enlargement, and deformation), etc. Specifically, the operation type may include changing the color, the brightness, the contrast, etc., of an operation area, deleting content of the operation area, replacing the content of the operation area with other content, enlarging/reducing/spinning the content of the operation area, performing bokeh/atomization/mosaicing on the content of the operation area, synthesizing the operation area, stitching operation area, modeling operation area, etc., which is not limited herein.

The operation area may be an entire image or a partial area in the image. According to a given manner, the operation area may include the logical area, the precise area, the misty area, or other areas. The logical area may refer to an area with a certain logical meaning, which may include a specified item (such as a football, a desk, a puppy, etc.), a specified background (such as sea, a mountain, etc.), a specified part (such as a human face, a skeleton structure, a wing of a bird, etc.), and the like. The logical areas are obtained through offline training of algorithms such as machine learning, and can be customized for users in a manner of online training. The precise area may refer to an area with precise positioning including precise coordinates and ranges, and precise requirements and ranges, such as a circular area with a center point of an image as an origin and a radius as 10 pixels, and positions of all colors with a RGB value as (255, 0, 0) in the image, etc. The misty area may refer to an area with a given direction but a slightly misty positioning and range, such as an upper left corner of the image, a red area, etc. In terms of the positioning and determination of the part of content, a range to be processed may be intelligently selected through a selection model obtained by offline training of a machine learning algorithm according to features of the image to be processed.

Optionally, the operation instruction may further include operation data which includes logic operation data, precise operation data, and misty operation data. The logical operation data may refer to data with a certain logical meaning, which may include a specified item (such as a football, a desk, a puppy, etc.), a specified background (such as sea, a mountain, etc.), a specified part (such as a human face, a skeleton structure, a wing of a bird, etc.), and the like. The precise data may include precise numerical parameters or precise addresses pointing to the data. For instance, in a logical instruction type, the logical instruction is changing a human face for a football, the operation type is replacement, the operation area is the face area, and the operation data is the football (or an address pointing to the football in the image). The misty data may include misty descriptions, such as "darker" color, "lower" brightness, and the like.

Optionally, an instruction format of the image processing instruction includes information such as an operational domain, an operation area, a target value, and a position domain, and other instruction information may be added according to different operational domains and/or operation areas. A feasible format is shown as follows:

| Operational domain | Operation area | Target value | Position domain |
|---|---|---|---|

The operational domain is configured to indicate specific operations, such as CHANGECOLOR (changing a color) and SPIN (spinning an image).

For instance, specific operations may be overall operations, such as CAREBODY (such as CARELEG, and CAREBREAST), CAREFACE, CONVERSION-S (such as changing into a Van Gogh style in one second, changing a non-oil painting to an oil painting, changing a background color of an image and a background season of an object in the image), CONVERSION-P (such as standing for sitting, a frontal face for a profile). The operation may include specified ALTER (for instance, altering a part such as altering a face or clothes; altering an object such as altering a cat for a dog, a horse for a zebra, an apple for an orange, and the like; altering a background such as altering a field for a forest). The operations may include more specified operations, such as MOV (movement), DEL (deletion), REP (replacement), COM (completion), OPT (optimization), which are configured to move an entire image or content in a specified operation area, delete an entire image or content in a specified operation area, replace an entire image or content in a specified operation area for other content, complete an entire image or content in a specified operation area, and optimize an entire image or content in a specified operation area, respectively.

Furthermore, specific operations may further include changing and transforming parameters of an image, an entire image, or a specified operation area. For instance, the operations may include parameters change (CHANGE-) such as CHANGECOLOR (color change), CHANGEBRIGHTNESS (brightness change), and CHANGECONTRAST (contrast change), changing shapes such as REDUCE (reduction), ENLARGE (enlargement), and DEFORM (deformation), BOKEH/ATOMIZE/MOSAIC (bokeh/atomizing/mosaicing), etc., which are configured to change the color of the entire image or a specified operation area, change the brightness of the entire image or a specified operation area, change the contrast of the entire image or a specified operation area, and perform bokeh/atomization/mosaicing on the content of the entire image or the operation area, etc.

Furthermore, specific operations may include operating an image, such as SYNTHESIS (image synthesis), FUSION (image fusion), STITCH (image stitching), MODEL (image modeling), ELIMINATION (object or shadow elimination), COLORING (image coloring), COMPRESSION (image compression), VECTORIZATION (image vectorization), etc.

Furthermore, specific operations may be a combined operation such as deleting and complementing, which can be abbreviated as DEL-COM. For instance, if an eye in a human face is covered, the cover can be removed and an eye can be reconstructed to add to the position. The combined operation may further include deleting and optimizing, which can be abbreviated as DEL-OPT. For instance, if users want to delete a boy on the playground, the area in which the boy is can be deleted, and the environment of the area can be optimized according to the surrounding environment.

The operation area is configured to indicate the way in which a value in a position domain represents the operation area, which may be an entire image (ALL), or a value of precise representations such as a rectangle (RECTANGLE), a triangle (TRIANGLE), a circle (CIRCLE), a pixel point (POINT), a square (SQUARE), an ellipse (ELLIPSE), a polygon (POLYGON), etc., or a misty domain (MISTY);

For different operational domains, the target value has different meanings. For instance, if the operational domain is CHANGECOLOR, the target value indicates a value of a replaced color; and if the operational domain is SPIN, the target value indicates a rotated angle. The target value may also indicate a changing trend. For instance, if the operational domain is CHANGEBRIGHTNESS, the target value may be a precise value of changed brightness, or be a brighter or darker changing trend.

A form of the position domain is determined by content of the operation area. For instance, if the operation area is TRIANGLE, the position domain is coordinates of three pixel points; if the operation area is MISTY, the position domain represents a position to be operated expressed in an abstract manner, which may be an organism or an object such as a dog (DOG), a pen (PEN), etc., or be environment or a background such as a sky (SKY), a playground (PLAYGROUND), etc., or be a local area such as a face (FACE), a wing of a bird (WING), skeleton (SKELETON), etc.

For instance, a process of inputting a single image and outputting a single image will be described below. A signal collector receives a voice signal, performs preprocessing on the voice signal to remove invalid information such as noise, etc., sends a preprocessed voice signal to an instruction conversion unit, parses the voice signal through a voice recognition technology, and converts the voice signal into a predefined image processing instruction; an image processing unit receives an image processing instruction, locates and divides an image to be processed through an image recognition technology according to the instruction to obtain an image editing area of the image to be processed. If operation data is required, the operation data is read from a storage unit and then sent to the image processing unit. The image processing unit performs a given operation on the image editing area of the image to be processed by using the operation data according to a processing instruction, and an image is output when the operation is completed.

Optionally, the image processor 1039 further includes a data statistics module configured to count user voice instructions. Then the data statistics module passes the user voice instructions to a user behavior analyzing module or a server to analyze user behavior, and adjusts and corrects a model (a target image processing model) and a parameter (a parameter corresponding to the target image processing model) which are commonly used by the user according to the user behavior, so as to complete customization, help the user to be more habitual in using and easier to obtain a user-desired image processing result.

For instance, when a camera is turned on, an electronic device can capture images in real time through the camera. A way to open the camera is not limited herein, for instance, the camera can be turned on by a triggering operation of users, a key pressing operation, a voice wake-up, or the like. If users do not send any signal, the signal processing device may not process the image, or may perform a preset default processing and display the image on the screen. The preset default processing in the memory of the electronic device may be contrast adjustment, brightness adjustment, image noise reduction, background bokeh, and the like. For instance, when a user send a signal, the electronic device may receive a signal sent by the user and convert the signal to obtain a corresponding instruction, then determine whether the instruction is an instruction of editing the image. If the instruction is an instruction of editing the image, the image is processed accordingly. The electronic device may receive and analyze the signal, obtain a corresponding instruction, edit the image according to the instruction, and display the image on the screen in real time.

Optionally, the signal may be a voice signal, and the signal processing device may receive the voice signal, extract valid information from the voice signal through the voice analysis technology to obtain an image processing instruction, and determine whether the image processing instruction is an instruction of editing the image. If the image processing instruction is an instruction of editing the image, a feature of the instruction may be further extracted to determine the image editing area and an editing mode.

Optionally, the signal may be a touch signal. The signal processing device may receive the touch signal, convert the touch signal into an instruction, and determine a touch screen position corresponding to the instruction and a desired editing method. When the touch signal is located at a certain position in the image, the signal processing device may obtain an area to be edited of the image. Preset areas to be edited with different ranges may be obtained by continuously touching the screen. For instance, touching and clicking a certain position (point) once represents editing the point; touching and clicking a certain position (point) twice consecutively represents editing a small rage of area where the point is in; touching and clicking a certain position (point) three times consecutively represents editing a large rage of area where the point is in; and touching and clicking a certain position (point) four times consecutively represents editing an entire image. For instance, if an obtained image includes a person's face, click on the person's nose once to select the point; click twice consecutively to select the nose; click three times consecutively to select the face; and click four times consecutively to select the entire image. When touch screen information is located in a preset or customized optional editing operation area, a selected editing operation can be performed on the image.

Optionally, the signal may be an action signal. The signal processing device may receive the action signal, and convert the signal into an instruction, which specifically refers to determining an editing area and an editing method required by the signal. For instance, obtaining an action of nodding represents approval of a current editing method, or obtaining an action of left-to-right wave represents changing a previous or a next preset editing method.

Optionally, in the examples of the present disclosure, a signal includes instruction information, where the instruction information may be used individually or in combination of two or more.

The voice signal may realize an overall operation on an image. For instance, for a voice signal of an "old photo", after the signal collector obtains the voice signal, the instruction converter converts the signal into an instruction. The instruction may include an image editing area (the entire image) and an image editing method (adding a filter of old photo). Then the image processor adds a filter of old photo to an obtained entire image and sends the image to the screen. The screen receives an edited image and displays the image to the user in real time. Before a new instruction signal is sent in, an identical editing operation is performed on subsequent real-time images obtained by the signal collector.

The voice signal may be performing a local operation on an image. For instance, for a voice signal of "adding a cute cat to a human face", after the signal collector collects the voice signal, the instruction converter converts the voice signal into an instruction. The instruction includes an image editing area (a human face) and an image editing method (adding a feature of a cat), and the information is sent to the image processor. The image processor locates a real-time obtained image sent by the image signal collector, locates the range of the human face and the position of the cat feature to be added, adds the feature of a cat accordingly, and sends an edited image to the screen. The screen receives the edited image and displays the edited image to users in real time. Before a new instruction signal is sent in, an identical editing operation is performed on subsequent real-time images obtained by the signal collector.

The voice signal may be combined with other types of signals to edit an image at the same time. For instance, when the signal collector obtains a voice signal of "increasing brightness", the signal converter converts the voice signal into an instruction. The instruction may include an image editing area (the entire image) and an image editing method (increasing brightness), and the information is sent to the image processor. The image processor increases the brightness of the entire real-time obtained image sent by the signal collector and sends an edited image to the screen. The screen receives the edited image and display the edited image to users in real time. In a short period of time, such as within 3 seconds after the edited image is displayed, the signal collector may receive a touch signal of sliding upward, and the instruction converter may convert the touch signal into an instruction, which specifically refers to determining whether the instruction is an instruction of an increasing or upward operation. Furthermore, the touch signal can be combined with the above instruction and represent continuing to increase brightness, then the image is sent to the image processor. The image processor further increases the brightness of the entire real-time obtained image sent by the signal collector and sends an edited image to the screen. The screen receives the edited image and displays the edited image to users in real time. Before a new instruction signal is sent in, an identical editing operation is performed on subsequent real-time images obtained by the signal collector, which is adjusting the brightness to the brightness required by the instruction signal.

Optionally, the signal collector obtains a voice signal of "adjusting brightness", and the instruction converter converts the voice signal into an instruction. The instruction may include an image editing area (the entire image) and an image editing method (adjusting brightness). The signal collector may obtain an action of sliding upward, and the instruction converter converts the action into an instruction, which specifically refers to determining the operation is an upward action to represent an increasing or upward operation, and sends a parsed voice instruction and touch instruction to the image processor. The image processor may combine received instructions to obtain the information of increasing brightness of the entire image, increasing the brightness of the image accordingly, and sending an edited image to the screen. The screen receives the edited image and displays the edited image to users in real time. Before a new instruction signal is sent in, an identical editing operation is performed on subsequent real-time images obtained by the signal collector, which is adjusting the brightness to the brightness required by the instruction signal.

Other types of instruction signals may be combined with a voice signal to edit an image. For instance, the signal processing device may receive a touch signal that a user clicks on a certain position on the screen, and the instruction converter converts the touch signal into an instruction, which specifically refers to determining the touch signal to be a focusing operation, and sends an edited image to the image processor. The image processor may perform a focusing operation on the edited image and display the edited image to the user through an image display unit in real time. The focusing operation may affect colors of other non-focus areas, and the user may further edit the image by using the voice signal. For instance, since a framing sky may turn white due to the focusing operation, the signal collector may receive a voice instruction signal of "changing a sky into blue" and send the voice instruction signal to the image processor. The image processor then edits the color of the sky based on the focusing operation, and sends an edited image to the screen. The screen receives the edited image and displays the edited image to the user in real time. Before a new instruction signal is sent in, an identical editing operation is performed on subsequent real-time images obtained by the signal collector, which is adjusting the brightness to the brightness required by the instruction signal.

Other types of instruction signals may be combined with a voice signal to edit the image. For instance, the signal processing device may receive a user's continuous sliding operation on a certain area of the screen, such as sliding along contour of a person's hair. The instruction converter converts the sliding action into an instruction, which specifically refers to determining and analyzing the sliding action to determine the area to be operated, and sends an edited image to the image processor. The signal collector receives a voice instruction signal such as "do not shred hair", and then the instruction converter determines and analyzes the voice signal to obtain an instruction, and send the instruction to the image processor.

The image processor may perform an editing operation specified by a voice signal in an area planned by a touch signal, and then send an edited image to the screen. The screen receives the edited image and displays the edited image to the user in real time. Before a new instruction signal is sent in, an identical editing operation is performed on subsequent real-time images obtained by the signal collector.

The voice signal may be combined with other types of instruction signals to edit an image in real time. For instance, the signal collector may obtain a voice signal of "adding my expression to the face of that person". The instruction converter determines and analyzes the voice signal, then determines that the voice signal is an image editing area (the position of the face) and an image editing method (changing the expression) to obtains an instruction, and sends the instruction to the image processor. The signal collector obtains an image signal, and the instruction converter converts the image signal into an instruction, and sends the instruction to the image processor. The image processor receives the signal, extracts expression features in the image signal, including facial expression features such as eyebrows, eyes, and a mouth, and relative distances, locates a face area of the input image and corresponding facial expression features, and edits the image according to the image signal. If a new image instruction signal is sent in, facial features of the image signal are extracted and the input image is edited. Before the new instruction signal is sent in, all subsequent real-time images obtained by the signal collector are edited in the same way as a last edit. Optionally, different devices may be used to obtain the image instruction signal and the image to be edited. For instance, a rear camera of a mobile phone is used to take pictures, and a front camera is used to receive the image instruction.

Furthermore, the image processor extracts expression features in the image signal, including facial expression features such as eyebrows, eyes, and a mouth, and relative distances, locates a face area of the input image and corresponding facial expression features, and edits the image according to the image signal. If a new image instruction signal is sent in, facial features of the image signal are extracted and the input image is edited. Before the new instruction signal is sent in, all subsequent real-time images obtained by the signal collector are edited in the same way as a last edit. Optionally, different devices may be used to obtain the image instruction signal and the image to be edited. For instance, a rear camera of a mobile phone is used to take pictures, and a front camera is used to receive the image instruction.

The voice signal may also be a method for automatically recognizing an image and optimizing an image by default. For instance, the signal collector may obtain a voice signal of "overall optimizing" sent by a user, and then the instruction converter determines and analyzes the voice signal to obtain an instruction. The instruction includes a function of "one sentence optimization" for the image. The instruction converter then sends the instruction to the image processor. After the signal collector obtains an image signal, the instruction converter determines and analyzes the image signal to obtain an instruction, and then sends the instruction to the image processor. The image processor receives the signal and optimizes content of the image by default. The default optimization includes: first recognizing and detecting a feature of the image, for a landscape image, automatically detecting and adjusting the image such as adjusting brightness, adjusting contrast, and increasing resolution; for a portrait image, automatically performing bokeh on the background and beautifying the portrait; for a landscape video or portrait video, automatically detecting the video and processing the landscape or portrait image in a video frame, considering coherence of the video including the coherence of landscape and people's actions, etc., eliminating noise caused by external factors such as jitter, and deleting or repairing unclear video frames.

Furthermore, in a specific implementation, if users send a new signal, the signal is reparsed and converted into an instruction, and a corresponding operation is performed; otherwise, when no new instruction information is sent in, the signal processing device may perform the same processing on subsequent images captured in real time until a photo-taking operation is received. In this case, the currently-captured image is edited as specified to generate a required photo until the operation ends.

For instance, the signal collector may receive an image selected by users from an image storing device or module (such as an album). An image selecting method is not limited herein. For instance, the image can be selected by a trigger operation performed by a user, or be selected by voice. When a user does not send any instruction information, the processing device may not process the image, or may perform a preset default processing and display the edited image to the image display unit. The preset default processing may be contrast adjustment, brightness adjustment, image noise reduction, background bokeh, and the like. When a user sends a signal, the processing device may receive a signal sent by the user and convert the signal to obtain an instruction, which specifically refers to determining whether the instruction is an instruction of editing the image. If the instruction is an instruction of editing the image, the image is processed accordingly. The instruction information refers to an instruction of editing an image. The signal processing device may receive a signal, parse the signal to obtain an instruction, edit the image according to the instruction, and display an edited image on the screen of the signal processing device in real time. If the user sends a new signal, the signal processing device may parse the signal to obtain an instruction, perform the corresponding operation according to the instruction until receiving the user's confirmation (such as receiving a storing command) or directly closing the operation, and generating the currently-edited image into a required image, or discarding and closing all editing operations. The operation ends.

Optionally, the image may be further processed after shooting. For instance, when a camera is turned on, images can be captured in real time. A method for opening the camera is not limited herein. For instance, the camera can be turned on by a trigger operation performed by a user, or be turned on by pressing a button or by voice. When a user does not send any signal, the signal processing device may not process the image, or may perform a preset default processing and display the edited image on the screen. The preset default processing may be contrast adjustment, brightness adjustment, image noise reduction, background bokeh, and the like. When a user sends a signal, the processing device may receive a signal sent by the user and convert the signal to obtain an instruction, which specifically refers to determining whether the instruction is an instruction of editing the image. If the instruction is an instruction of editing the image, the image is processed accordingly. The signal refers to an instruction of editing an image. The signal processing device may receive a signal, parse the signal to obtain an instruction, edit the image according to the instruction, and display an edited image on the screen in real time. If the user sends a new signal, the signal processing device may parse the signal to obtain an instruction, perform the corresponding operation on the image according to the instruction; otherwise, when no new instruction information is sent in, the signal processing device may perform the same processing on subsequent images captured in real time until a photo-taking operation is received. In this case, the currently-captured image is edited as specified to generate a required photo, then the signal processing device may receive the instruction signal sent by the user, further edit the generated photo, and display the edited photo on the screen in real time.

Furthermore, if a user sends a new signal, the signal processing device may parse the signal to obtain an instruction, perform the corresponding operation according to the instruction until receiving the user's confirmation (such as receiving a storing command) or directly closing the operation, and generating the currently-edited image into a required image, or discarding and closing all editing operations. The operation ends. If an operation signal of turning off an imaging device is not received, after a user-specified operation is performed on the edited image, such as storing or discarding the image, images continue to be captured in real time if a new signal is received.

When the camera is turned on, the signal processing device can capture an image in real time and send the image to the processing device. A method for opening the camera is not limited herein. For instance, the camera can be turned on by a trigger operation performed by a user, or be turned on by pressing a button or by voice. When a user does not send any signal, the signal processing device may not process the image, or may perform a preset default processing and display the edited image on the screen. The preset default processing may be contrast adjustment, brightness adjustment, image noise reduction, background bokeh, and the like. When a user sends a signal, the processing device may receive a signal sent by the user and convert the signal to obtain an instruction, which specifically refers to determining whether the instruction is an instruction of editing the image. If the instruction is an instruction of editing the image, the image is processed accordingly. The signal refers to an instruction of editing an image. The signal processing device may receive a signal, parse the signal to obtain an instruction, edit the image according to the instruction, and display an edited image on the screen in real time. If the user sends a new signal, the signal processing device may parse the signal to obtain an instruction, perform the corresponding operation on the image according to the instruction; otherwise, when no new instruction information is sent in, the signal processing device may perform the same processing on subsequent images captured in real time until a videotaping operation is received. In this case, the camera starts videotaping and may modify a video obtained by videotaping until an instruction of ending videotaping is received. When a required video is generated, the operation ends.

For instance, during the videotaping process, an instruction signal may be received to edit ongoing videotaping in real time. During the videotaping process, a user sends a voice signal of "changing clothes into a football uniform". The signal collector collects voice information, and the instruction converter segments and clusters scenes of the voice signal by using voice segmentation algorithms (such as box counting dimension silence detection, Bayesian information criteria, etc.) and voice clustering algorithms. Therefore, voice instructions may be separated from sounds of recorded scenes, while the sounds of recorded scenes are stored, and the voice instructions are further determined and analyzed. The information is determined to be an image editing area (clothes) and an image editing method (changing into a football uniform), and is then passed to the image processor. The image processor may locate an image obtained in real time, locate the area of clothes, and accordingly replace the clothes with the football uniform, store the video frame as an edited video frame, and then send the edited video frame to the screen. The screen receives the edited image and display the edited image to the user in real time. Before a new instruction signal is sent in, an identical editing operation is performed on subsequent real-time images obtained by the signal collector.

When the user sends a new voice signal such as "changing clothes to a basketball uniform", the signal collector collects voice information, and the command converter analyzes the voice signal by using the voice analysis technology, so as to separate voice instructions and sounds of video scenes. The sounds of recorded scenes are stored, and the voice instructions are further determined and analyzed. The information is determined to be an image editing area (clothes) and an image editing method (changing into a basketball uniform), and is then passed to the image processor. The image processor may locate an image obtained by the signal collector in real time, locate the area of clothes, and accordingly replace the clothes with the basketball uniform. Since an editing range of the instruction is the same as that of the previous instruction, both of which are the area of clothes, an editing effect of the instruction is equivalent to replacing the editing effect of the previous instruction, which means all the area of clothes in subsequent video frames are basketball uniforms. The video frame is stored as an edited video frame, and is then sent to the screen. The screen receives the edited image and display the edited image to the user in real time. Before a new instruction signal is sent in, an identical editing operation is performed on subsequent real-time images obtained by the signal collector.

Furthermore, when the user sends a new voice signal such as "holding a basketball in hand", the signal collector collects the voice signal, and the command converter converts the voice signal into an instruction and analyzes the voice signal by using the voice analysis technology, so as to separate voice instructions and sounds of video scenes. The sounds of recorded scenes are stored, and the voice instructions are further determined and analyzed. The information is determined to be an image editing area (a hand) and an image editing method (adding a basketball in a manner of holding), and is then passed to the image processing unit. The processing unit may locate an image obtained by the signal collector in real time, locate the area of the hand, and accordingly add an operation of holding a basketball. Since an editing range of the instruction is different from that of the previous instruction, the editing effect of the instruction is equivalent to adding to the editing effect of the previous instruction, which means all the area of clothes in subsequent video frames are basketball uniforms and a basketball is held in a person's hand. The video frame is stored as an edited video frame, and is then sent to an image displaying unit. The image displaying unit receives the edited image and display the edited image to the user in real time. Before a new instruction signal is sent in, an identical editing operation is performed on subsequent real-time images obtained by the image obtaining unit.

The voice signal may also be combined with other types of signals to edit an image in real time. For instance, the signal collector may obtain a voice signal of "adding my expression to the face of that person". The instruction converter determines and analyzes the voice signal, then determines that the voice signal is an image editing area (the position of the face) and an image editing method (changing the expression) to obtains an instruction, and sends the instruction to the image processor. The signal collector obtains an image signal, and the instruction converter converts the image signal into an instruction, and sends the instruction to the image processor. The image processor receives the signal, extracts expression features in the image signal, including facial expression features such as eyebrows, eyes, and a mouth, and relative distances, locates a face area of the input image and corresponding facial expression features, and edits the image according to the image signal. If a new image instruction signal is sent in, facial features of the image signal are extracted and the input image is edited. Before the new instruction signal is sent in, all subsequent real-time images obtained by the signal collector are edited in the same way as the last edit. Optionally, different devices may be used to obtain the image instruction signal and the image to be edited. For instance, a rear camera of a mobile phone is used to take pictures, and a front camera is used to receive the image instruction.

For instance, the signal collector may receive an image selected by users from an image storing device or module (such as an album). An image selecting method is not limited herein. For instance, the image can be selected by a trigger operation performed by a user, or be selected by voice. When a user does not send any instruction information, the processing device may not process the image, or may perform a preset default processing and display the edited image to the image display unit. The preset default processing may be contrast adjustment, brightness adjustment, image noise reduction, background bokeh, and the like. When a user sends a signal, the processing device may receive a signal sent by the user and convert the signal to obtain an instruction, which specifically refers to determining whether the instruction is an instruction of editing the image. If the instruction is an instruction of editing the image, the image is processed accordingly. The instruction information refers to an instruction of editing an image. The signal processing device may receive a signal, analyze the signal to obtain an instruction, edit the image according to the instruction, and display an edited image on the screen in real time.

Furthermore, if an instruction of a user specifying and selecting a specific video frame or a video segment is received, the video frame or the video frame of the video segment is edited; otherwise, if only the video frame where the editing starts is received while the video frame where the editing ends is not received, the editing starts from the specified video frame by default and an identical operation is performed on all subsequent video frames. If no information of a user specifying a video frame is received, an entire video may be edited. If the user sends a new signal, the signal may be converted into an instruction, and a corresponding operation may be performed according to the instruction until the user's confirmation (such as a storing command is received) is received or the operation is directly closed, then a currently-edited video may be stored, or all editing operations may be discarded and closed. The operation ends.

Optionally, before the signal collector 1019 receives the signal, the image processor 1039 may implement adaptive training on an image processing model to obtain the target image processing model.

The adaptive training on the image processing model is implemented offline or online.

Specifically, the adaptive training on the image processing model being implemented offline refers to that the image processor 1039 may implement adaptive training on the image processing model on the basis of hardware of the image processor 1039 to obtain a target signal instruction conversion model; the adaptive training on the image processing model being implemented online refers to that the cloud server different from the image processor 1039 may implement adaptive training on the image processing model to obtain a target image processing model. When the image processor 1039 needs to use the target image processing model, the image processor 1039 obtains the target image processing model from the cloud server.

Optionally, the adaptive training implemented on an image processing model is supervised or unsupervised.

Specifically, the adaptive training implemented on the image processing model being supervised refers to that:

for a voice signal, the image processor 1039 converts the voice signal into a predicted image according to the image processing model; then determines a correlation coefficient between the predicted image and a corresponding target image of the predicted image, where the target is an image obtained by manually processing an image to be processed according to the voice signal; and the image processor 1039 optimizes the image processing model according to the correlation coefficient between the predicted image and the corresponding target image of the predicted image to obtain the target image processing model; and for an image signal, the image processor 1039 converts the image signal into a predicted image according to the image processing model; then determines a correlation coefficient between the predicted image and a corresponding target image of the predicted image, where the target is an image obtained by manually processing an image to be processed according to the voice signal; and the image processor 1039 optimizes the image processing model according to the correlation coefficient between the predicted image and the corresponding target image of the predicted image to obtain the target image processing model.

In the examples of the present disclosure, a method for obtaining an image processing model is not limited. The image processing model may be obtained through the offline training or online training, where the training algorithm includes, but is not limited to: a neural network algorithm, a support vector machine algorithm, a decision tree algorithm, and other supervised, unsupervised, or semi-supervised training methods.

For instance, a process of training an image classification model by using the neural network algorithm according to labeled data may include: initializing a model parameter randomly or according to a specified rule, inputting multiple sets of training data with classification labels, obtaining a computation result of the model through a model computation, comparing a computation result with a correct result to obtain an error value, back-propagating the error value by using a back-propagation algorithm, and training the parameter in the process. This process is repeatedly performed until an error rate of the model for image classification is not greater than a given threshold or an accuracy is not smaller than a given threshold or the training reaches a specified number of iterations, so as to obtain an image processing model.

In an example, the signal processing device 100 may further include:

the trainer 1059 configured to convert the signal into a prediction instruction according to the signal instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model.

For instance, the adaptive training implemented on an image processing model being supervised may include: the image processor 1039 or the trainer 1059 receives a segment of voice signals containing related commands such as changing the color of an image or spinning an image. Each command corresponds to one target image. For the input voice signal used for adaptive training, the corresponding target image is known. The image processor 1039 or the trainer 1059 takes the voice signals as the input data of the image processing model to obtain an output predicted image. The image processor 1039 or the trainer 1059 computes the correlation coefficient between the prediction instruction and the corresponding instruction set of the prediction instruction, adaptively updates parameters (such as weights, biases, and the like) in the signal instruction conversion model to improve performance of the image processing model, and then obtains the target image processing model.

Taking an image signal as an example, the image processor 1039 or the trainer 1059 receives a segment of image signals containing related commands such as changing the color of an image or spinning an image. Each command corresponds to one target image. For the input image signal used for adaptive training, the corresponding target image is known. The image processor 1039 or the trainer 1059 takes the image signals as the input data of the image processing model to obtain an output predicted image. The image processor 1039 or the trainer 1059 computes the correlation coefficient between the predicted image and the corresponding instruction set of the predicted image, adaptively updates parameters (such as weights, biases, and the like) in the image processing model to improve performance of the image processing model, and then obtains the target image processing model.

In an example, the instruction converter 1029 of the signal processing device 100 may be configured to perform adaptive training on the signal instruction conversion model in the instruction converter 1029 to obtain a target signal instruction conversion model. The image processor 1039 of the signal processing device 100 may be configured to perform adaptive training on the image processing model in the image processor 1039 to obtain a target image processing model.

In an example, the signal processing device 100 may further include:

a trainer 1059 configured to perform adaptive training on the signal instruction conversion model in the instruction converter 1029 and the image processing model in the image processor 1039 respectively to obtain a target signal instruction conversion model and a target image processing model.

The trainer 1059 is capable of adjusting a structure and a parameter of the signal instruction conversion model or the image processing model in a supervised or unsupervised manner to improve performance of the signal instruction conversion model or the image processing model and finally obtain the target signal instruction conversion model or the target image processing model.

In an example, the signal processing device 100 is presented in the form of modules. The "Module" may refer to an application-specific integrated circuit (ASIC), a processor and a memory executing one or more software or firmware programs, an integrated logic circuit, and/or other components that provide the described functions. In addition, the signal collector 1019, the instruction converter 1029, the image processor 1039, the storage module 104, and the trainer 1059 may be implemented by the device shown from FIG. 5A to FIG. 8.

In an example, the instruction converter 1029 of the signal processing device 100 or the processing module 1032 of the image processor 1039 is an artificial neural network chip, which means that the instruction converter 1029 and the processing module 1032 of the image processor 1039 are two independent artificial neural network chips. The structures of the instruction converter 1029 and the processing module 1032 are shown from FIG. 5A to FIG. 8 respectively.

In the present device, the instruction converter 1029 and the processing module 1032 may be performed either serially or in a soft-pipelining manner, which means that the instruction converter 1029 may process a next image when the processing module 1032 processes a previous image, which may improve hardware throughput rate and image processing efficiency.

Figure 5A:
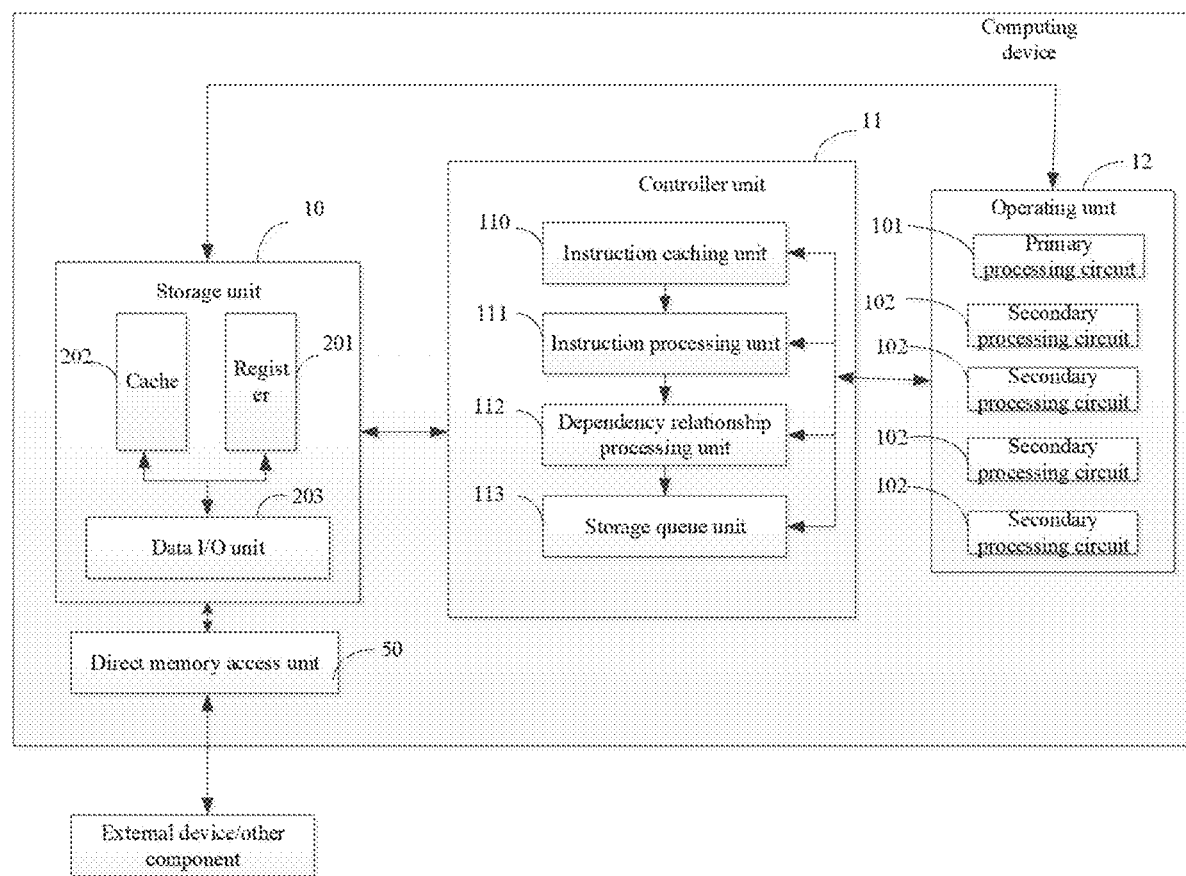
FIG. 5A is a structural diagram of a computation device according to one example of the present disclosure.

Referring to FIG. 5A, a computation device is provided. The computation device is configured to perform a machine learning computation, and includes: a controller unit 11 and an operation unit 12, where the controller unit 11 is connected to the operation unit 12, the operation unit 12 may include: a primary process circuit and multiple secondary processing circuits; and the controller unit 11 may be configured to obtain input data and a computation instruction; optionally, the input data and the computation instruction may be obtained through a data input/output unit, where the data input/output unit may specifically be one or more data I/O interfaces or I/O pins.

The computation instruction includes, but is not limited to, a forward operation instruction, a backward training instruction, or other neural network operation instruction such as a convolution operation instruction. A specific expression of the computation instruction is not limited in the present disclosure.

The controller unit 11 may be further configured to parse the computation instruction to obtain multiple operation instructions, and send the multiple operation instructions and the input data to the primary processing circuit;

a primary processing circuit 101 may be configured to perform pre-processing on the input data, and transfer data and operation instructions among the multiple processing circuits;

multiple secondary processing circuits 102 may be configured to perform an intermediate operation in parallel according to the data and the operation instructions transferred from the primary processing circuit to obtain multiple intermediate results, and transfer the multiple intermediate results to the primary processing circuit; and the primary processing circuit 101 may be configured to perform subsequent processing on the multiple intermediate results to obtain a computing result of the computation instruction.

The technical solution provided in the present disclosure sets the operation module into a one-master and multi-slave structure. For a computation instruction of a forward operation, the operation module may split data according to the computation instruction of a forward operation, so that multiple secondary processing circuits can perform a parallel computation on a part with a large amount of computations, which may increase operating speed, saving operating time, and further reduce power consumption.

In an example, the machine learning computation may include an artificial neural network operation. The input data may include input neuron data and weight data. The computing result may include a result of the artificial neural network operation, which is also known as output neuron data A neural network operation may be an operation of one layer of a neural network. For a multi-layer neural network, the implementation process may be executed as follows. In the forward operation, if the forward operation of a previous layer artificial neural network is completed, operation instructions of a next layer will operate the output neuron processed in the operation unit as the input neuron of the next layer (or perform some operations on the output neuron, and then the output neuron is operated as the input neuron of the next layer). At the same time, the weight is also replaced by the weight of the next layer. In the reverse operation, if the reverse operation of a previous artificial neural network is completed, operation instructions of a next layer will operate an input neuron gradient processed in the operation unit as an output neuron gradient of the next layer (or perform some operations on the input neuron gradient, and then the input neuron gradient is operated as the output neuron gradient of the next layer). At the same time, the weight is also replaced by the weight of the next layer.

The machine learning computation may further include support a vector machine operation, a k-nn operation, a k-means operation, a principal component analysis operation, and the like. For the convenience of description, the artificial neural network operation is used as an example to illustrate specific schemes of a machine learning computation.

For an artificial neural network operation, if the artificial neural network operation has a multi-layer operation, and an input neuron and an output neuron of the multi-layer operation do not refer to a neuron in an input layer and an output layer of the entire neural network, but refer to any two adjacent layers in the network, then the neuron in a lower layer of the network forward operation is the input neuron and the neuron in an upper layer of the network forward operation is the output neuron. Taking a convolutional neural network as an example, given that a convolutional neural network has L layers, and K=1, 2, ..., L−1, a $K^{th}$ layer is named as an input layer and the neuron in this layer is the input neuron. A $K+1^{th}$ layer is named as an output layer and the neuron in this layer is the output neuron. In other words, except a top layer, each layer can be used as an input layer, and the next layer is the corresponding output layer.

In an example, the second processor may further include a storage unit 10 and a direct memory access (DMA) unit 50, where the storage unit 10 may include one or any combination of a register and a cache. Specifically, the cache may be configured to store the computation instruction, and the register may be configured to store the input data and a scalar. The cache may be a scratch pad cache. The DMA unit 50 may be configured to read or store data from the storage unit 10.

Alternatively, the controller unit may include an instruction caching unit 110, an instruction processing unit 111, and a storage queue unit 113; where the instruction caching unit 110 may be configured to store the computation instruction associated with the artificial neural network operation;

the instruction processing unit 111 may be configured to parse the computation instruction to obtain multiple operation instructions; and the storage queue unit 113 may be configured to store an instruction queue, where the instruction queue may include the multiple operation instructions or the computation instruction to be executed in a sequence.

For instance, in an optional technical solution, the primary processing circuit may also include a control module, where the control module may include a primary instruction processing unit for decoding an instruction into a microinstruction. In another example, another control module may also include a secondary instruction processing unit for receiving and processing the microinstruction. The microinstruction may be obtained by splitting or decoding the instruction, and may be further decoded into control signals of each component, each unit, or each processing circuit.

In an example, the structure of the computation instruction may be shown as in a table below.

| Opcode | Register or Immediate | Register/ Immediate data | ... |
|---|---|---|---|

An ellipsis in the above table indicates that multiple registers or immediate data may be included.

In another alternative technical solution, the computation instruction may include one or more opcode fields and one opcode. The computation instruction may include a neural network operation instruction. Taking the neural network operation instruction as an example, as illustrated in the table below, a register number 0, a register number 1, a register number 2, a register number 3, and a register number 4 may be opcode fields. Each of the register number 0, the register number 1, the register number 2, the register number 3, and register number 4 may correspond to one or more registers.

| Opcode | Register number 0 | Register number 1 | Register number 2 | Register number 3 | Register number 4 |
|---|---|---|---|---|---|
| COMPUTE | Starting address of the input data | Length of the input data | Starting address of the weight | Length of the weight | Address of activation function interpolation table |
| IO | Address of external data memory | Data length | Address of internal data memory | | |
| NOP | | | | | |
| JUMP | Destination address | | | | |
| MOVE | Input address | Data size | Output address | | |

The above registers may be off-chip memories. In practical applications, the above registers may also be on-chip memories for storing data. The data may be n-dimensional data, where n is an integer greater than or equal to one. For instance, if n=1, the data is one-dimensional data (a vector); if n=2, the data is two-dimensional data (a matrix); and if n=3 or above, the data is a multi-dimensional tensor.

In an example, the controller unit may further include a dependency relationship processing unit 108. If multiple operation instructions are provided, the dependency relationship processing unit 108 may be configured to determine whether there exists an associated relationship between a first operation instruction and a zeroth operation instruction before the first operation instruction. If there exists an associated relationship between the first operation instruction and the zeroth operation instruction, the dependency relationship processing unit 108 caches a first operation instruction in the instruction storage unit, and extracts the first operation instruction from the instruction storage unit to the operation module after the zeroth operation instruction is executed.

The determining whether there exists an associated relationship between the first operation instruction and the zeroth operation instruction before the first operation instruction includes:

extracting a first storage address interval of data required (such as a matrix) in the first operation instruction according to the first operation instruction, extracting a zeroth storage address interval of matrix required in the zeroth operation instruction according to the zeroth operation instruction, determining that there exists an associated relationship between the first operation instruction and the zeroth operation instruction if an overlapped area exists between the first storage address interval and the zeroth storage address interval, and determining that there does not exist an associated relationship between the first operation instruction and the zeroth operation instruction if no overlapped area exists between the first storage address interval and the zeroth storage address interval.

Figure 5B:
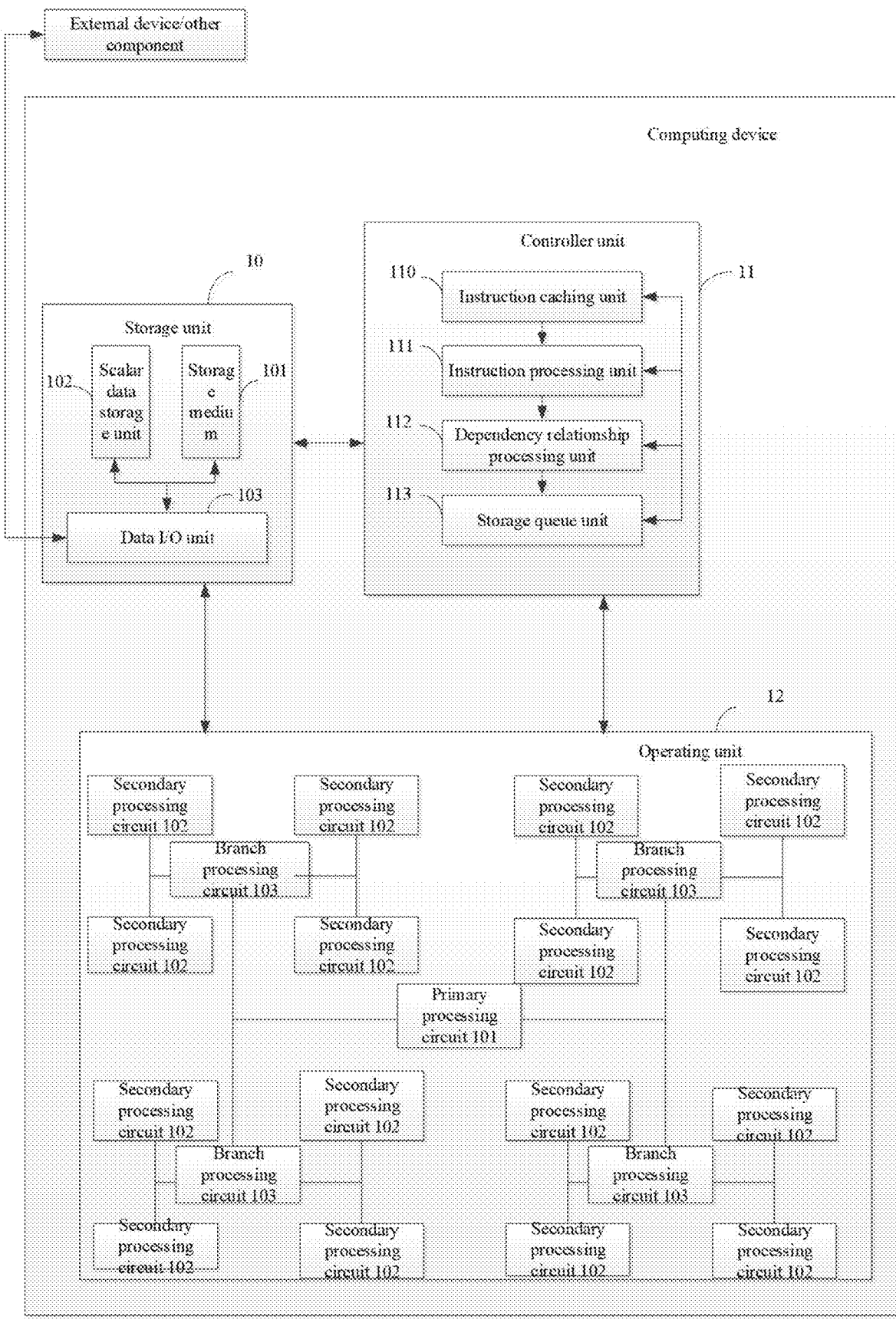
FIG. 5B is a structural diagram of a computation device according to one example of the present disclosure.
Figure 5C:
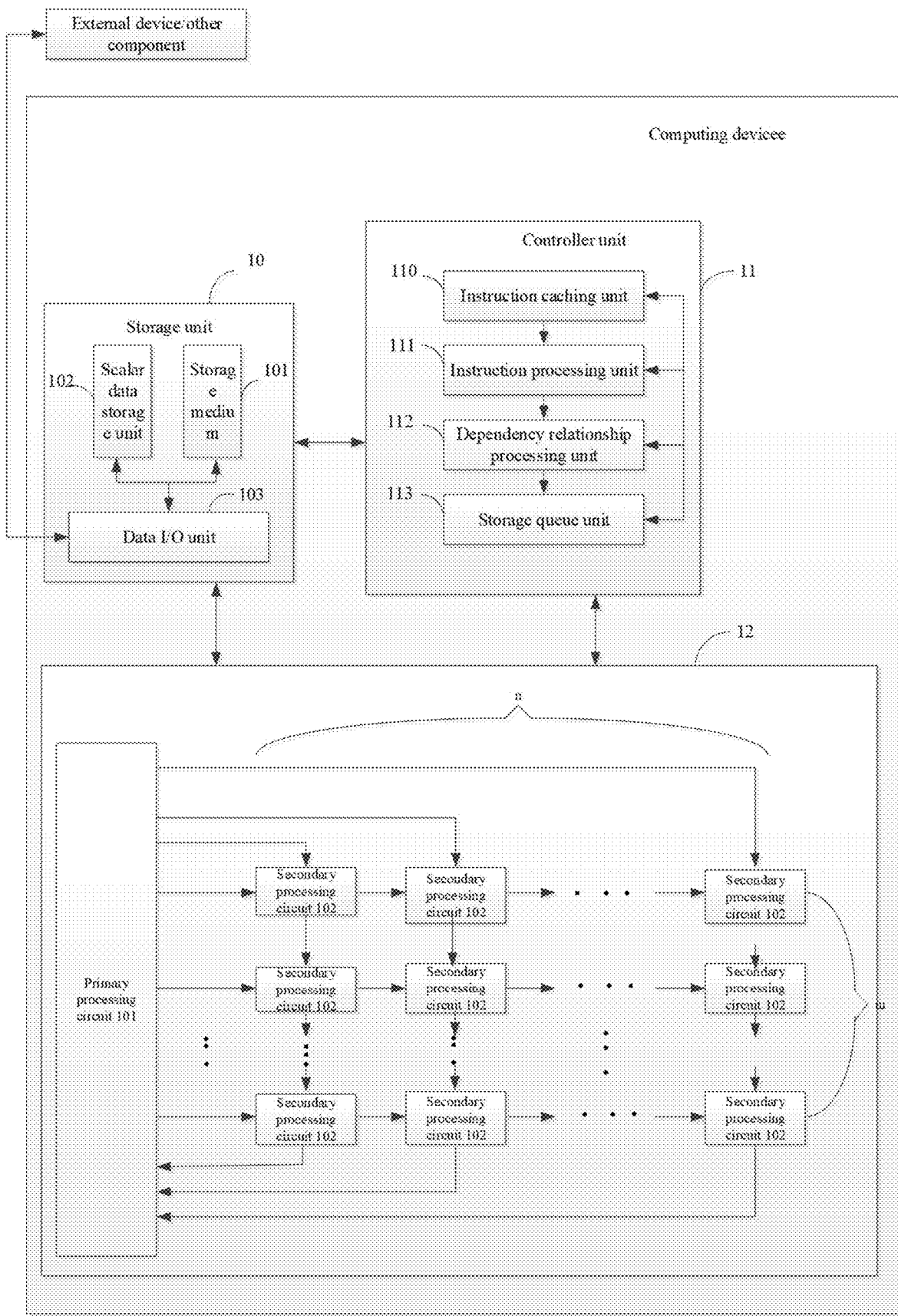
FIG. 5C is a structural diagram of a computation device according to another example of the present disclosure.

In another example, the operation unit 12 as shown in FIG. 5B may include one primary processing circuit 101 and multiple secondary processing circuits 102. In an example, as shown in FIG. 5C, the multiple secondary processing circuits are distributed in an array. Each secondary processing circuit may be connected with adjacent other secondary processing circuits. The primary processing circuit may be connected with K secondary processing circuits of the multiple secondary processing circuits. The K secondary processing circuits may include n secondary processing circuits in a first row, n secondary processing circuits in an $m^{th}$ row, and m secondary processing circuits in a first column. It should be noted that the K secondary processing circuits as shown in FIG. 5C only include n secondary processing circuits in the first row, n secondary processing circuits in the $m^{th}$ row, and m secondary processing circuits in the first column. In other words, the K secondary processing circuits are secondary processing circuits which are directly connected with the primary processing circuit in the multiple secondary processing circuits.

The K secondary processing circuits may be configured to forward data and instructions transferred among the primary processing circuit and the multiple secondary processing circuits.

Figure 5D:
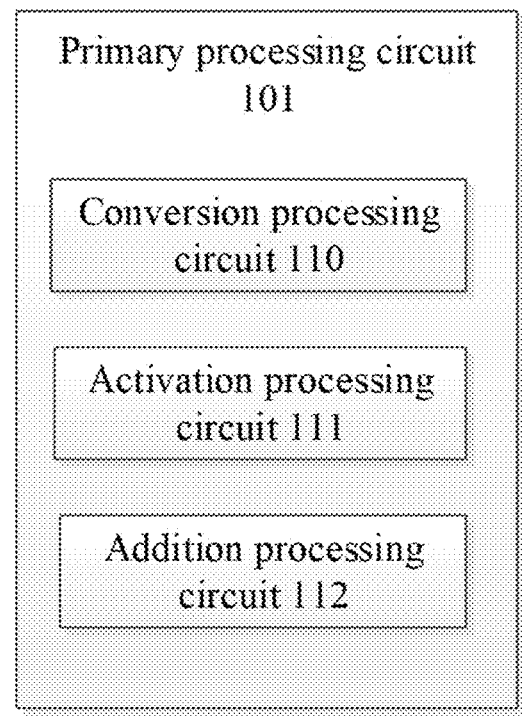
FIG. 5D is a structural diagram of a primary processing circuit according to one example of the present disclosure.

Optionally, as shown in FIG. 5D, the primary processing circuit may further include one or any combination of a conversion processing circuit 110, an activation processing circuit 111, and an addition processing circuit 112; where the conversion processing circuit 110 may be configured to perform interchange (such as conversion between continuous data and discrete data) between a first data structure and a second data structure on a data block or an intermediate result received by the primary processing circuit; or perform interchange (such as conversion between a fixed-point type and a floating-point type) between a first data type and a second data type on a data block or an intermediate result received by the primary processing circuit;

an activation processing circuit 111 may be configured to perform an activation operation on data in the primary processing circuit; and an addition processing circuit 112 may be configured to perform an addition operation or an accumulation operation.

The primary processing circuit may be configured to determine the input neuron to be broadcast data and the weight to be distribution data, distribute the distribution data into multiple data blocks, and send at least one of the multiple data blocks and at least one of the multiple operation instructions to the secondary processing circuit;

the multiple processing circuits may be configured to perform an operation on a received data block according to the operation instruction to obtain an intermediate result, and send an operation result to the primary processing circuit; and the primary processing circuit may be configured to process multiple intermediate results sent by the multiple secondary processing circuits to obtain a result of the computation instruction, and send the result of the computation instruction to the controller unit.

The secondary processing circuit may include:

a multiplication processing circuit configured to perform multiplication on a received data block to obtain a multiplication result;

a forwarding processing circuit (optional) configured to forward the received data block or the multiplication result; and an accumulation processing circuit configured to perform accumulation on the multiplication result to obtain the intermediate result.

In another example, the operation instruction may be a computation instruction such as a matrix multiplication instruction, an accumulation instruction, an activation instruction, and the like.

A specific computing method of the computation device shown in FIG. 5A is described below by using a neural network operation instruction. For a neural network operation instruction, a formula which actually needs to to be executed may be $s=s(\Sigma wx_i+b)$. This formula means multiplying a weight w by input data $x_i$, accumulating multiplication results, adding a bias b, and performing an activation operation s(h) to obtain a final output result S.

Figure 5E:
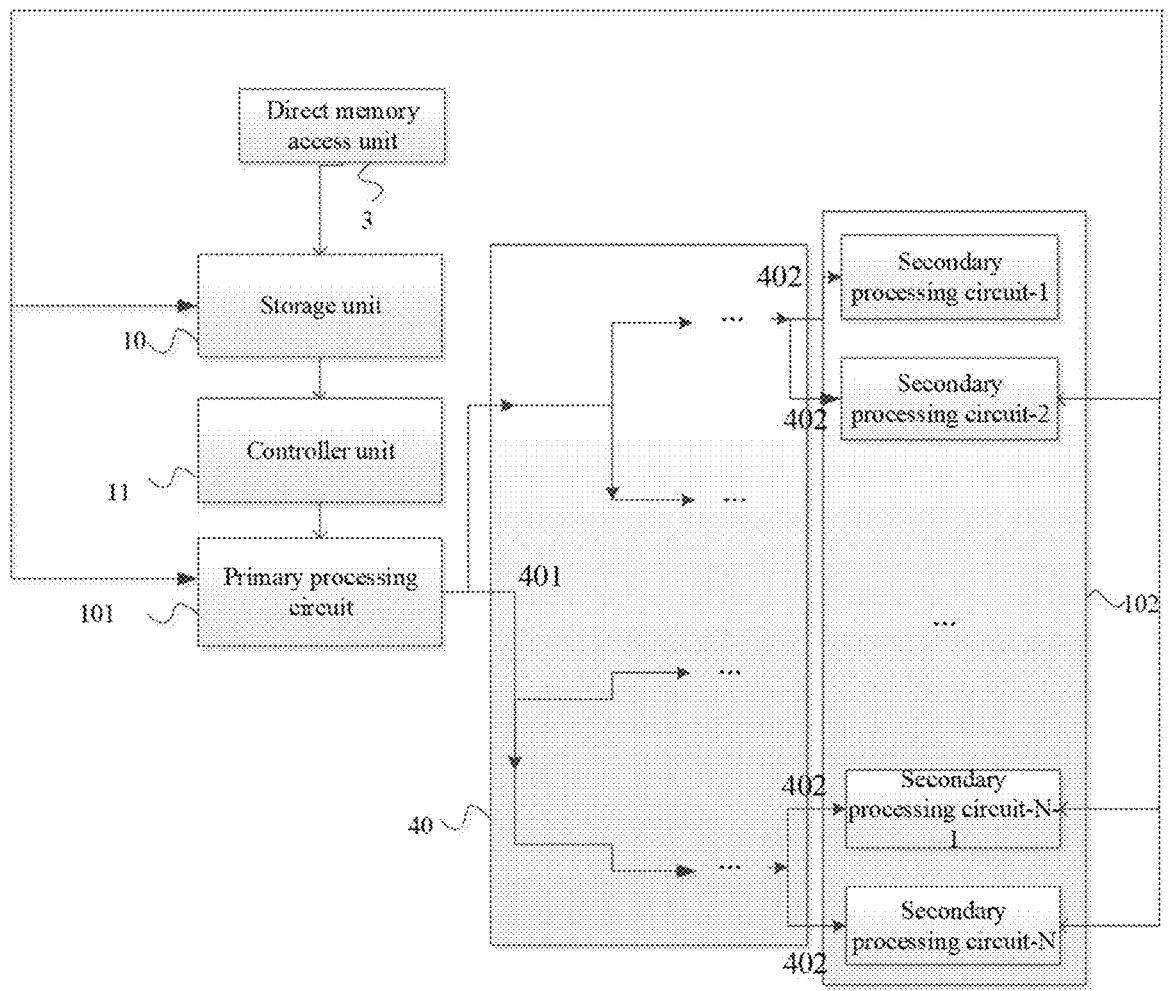
FIG. 5E is a structural diagram of another computation device according to one example of the present disclosure.

In an example, as shown in FIG. 5E, the operation unit includes a tree module 40, where the tree module includes: a root port 401 and multiple branch ports 404. The root port of the tree module is connected to the primary processing circuit, and the multiple branch ports of the tree module are respectively connected to one of the multiple secondary processing circuits.

Figure 6A:
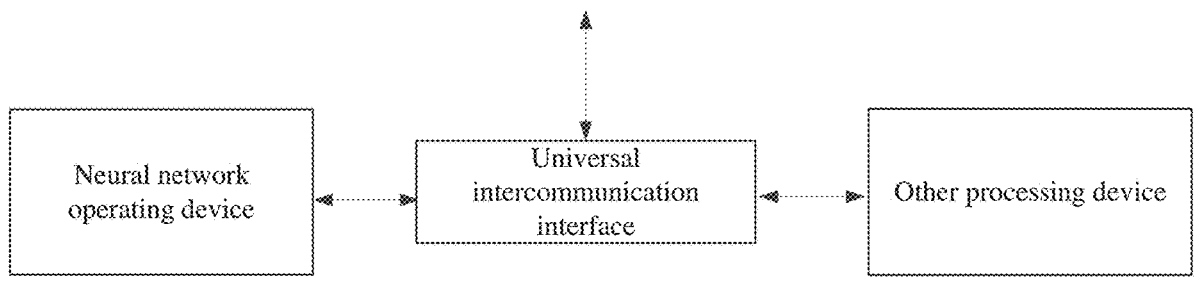
FIG. 6A is a structural diagram of a combined processing device according to one example of the present disclosure.
Figure 6B:
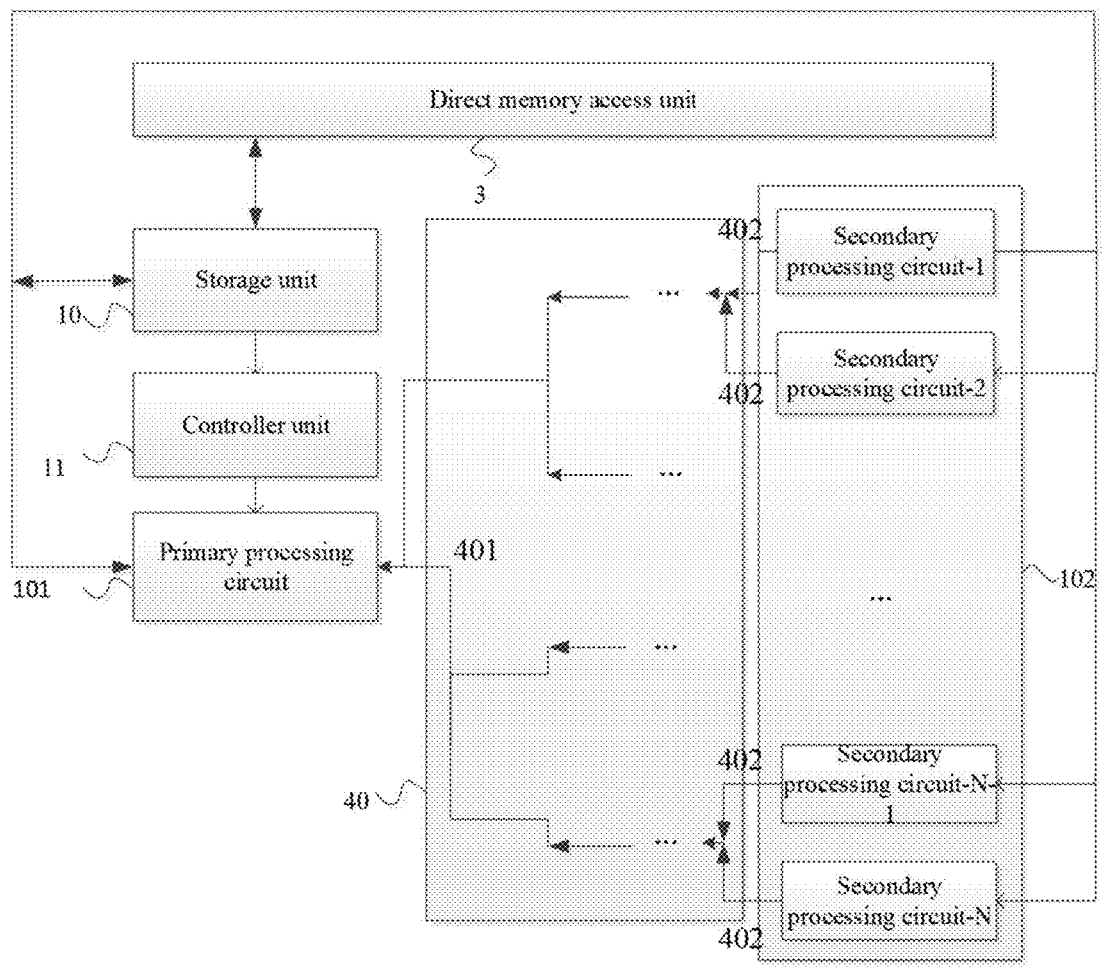
FIG. 6B is a structural diagram of a computation device according to one example of the present disclosure.

The tree module may have a transceiving function. As shown in FIG. 5E, the tree module may have a transferring function. As shown in FIG. 6B, the tree module may have a receiving function.

The tree module may be configured to forward data blocks, weights, and operation instructions among the primary processing circuit and the multiple secondary processing circuits.

Optionally, the tree module is a selectable result of the computation device, and may include at least one layer of nodes. Each node is a line structure with a forwarding function and may not have a computing function. If the tree module has a zero layer of nodes, the tree module may not be needed for the computation device.

Figure 5F:
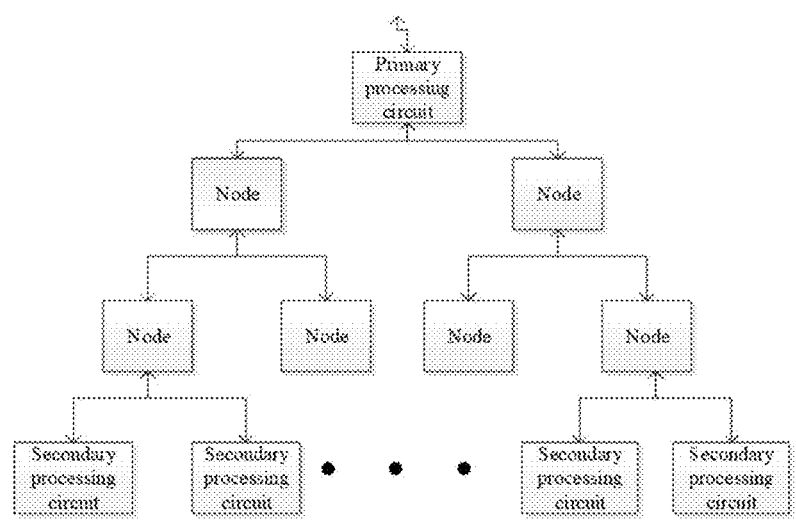
FIG. 5F is a structural diagram of a tree module according to one example of the present disclosure.

Optionally, the tree module may be an n-tree structure, such as a binary tree structure as shown in FIG. 5F, and may also be a tri-tree structure, where n may be an integer greater than or equal to two. The examples of the present disclosure do not limit a specific value of n. The number of layers may be two, and the secondary processing circuit may be connected with nodes of other layers other than nodes of a second last layer. For instance, the secondary processing circuit may be connected with nodes of a first last layer illustrated in FIG. 5F.

Figure 5G:
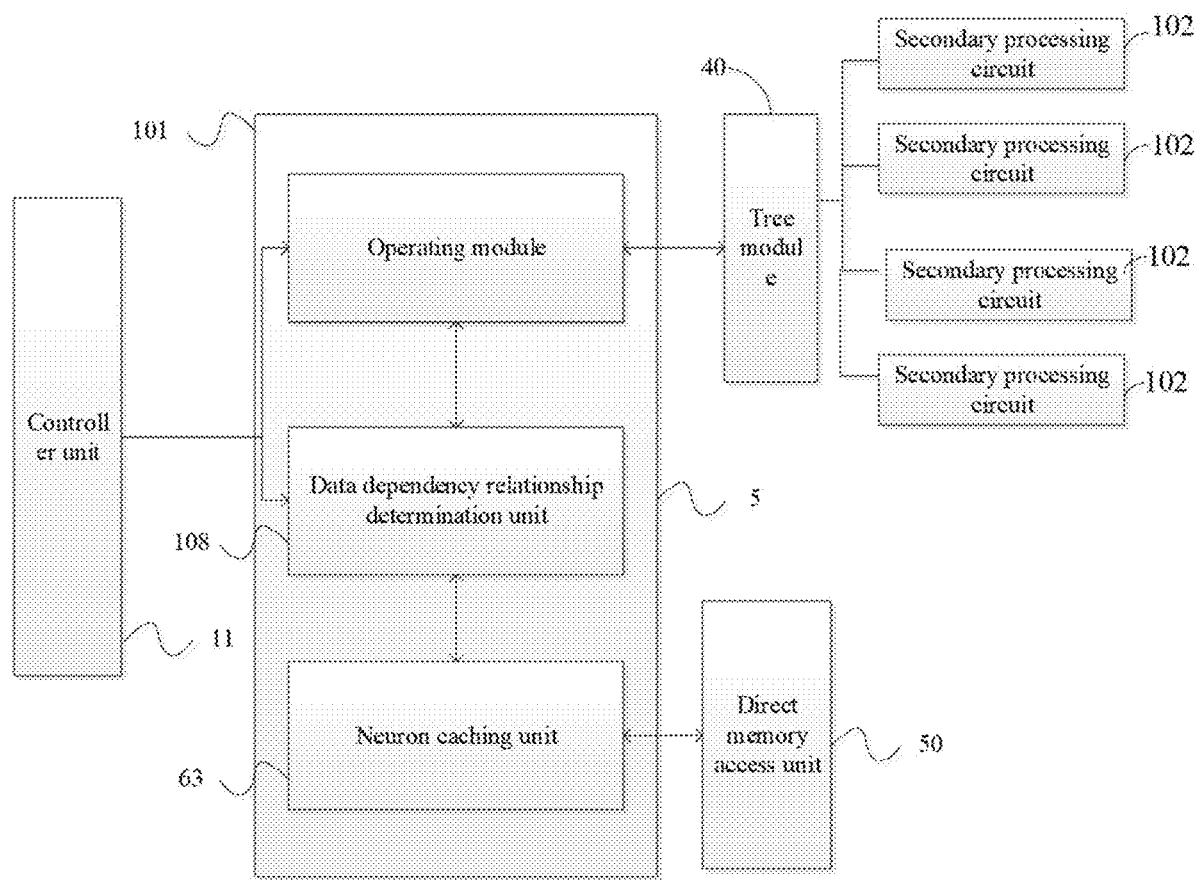
FIG. 5G is a structural diagram of another computation device according to one example of the present disclosure.

Optionally, the operation unit may be provided with a separate cache. As shown in FIG. 5G, the operation unit may include a neuron caching unit 63 configured to cache input neuron vector data and output neuron weight data of the secondary processing circuit.

Figure 5H:
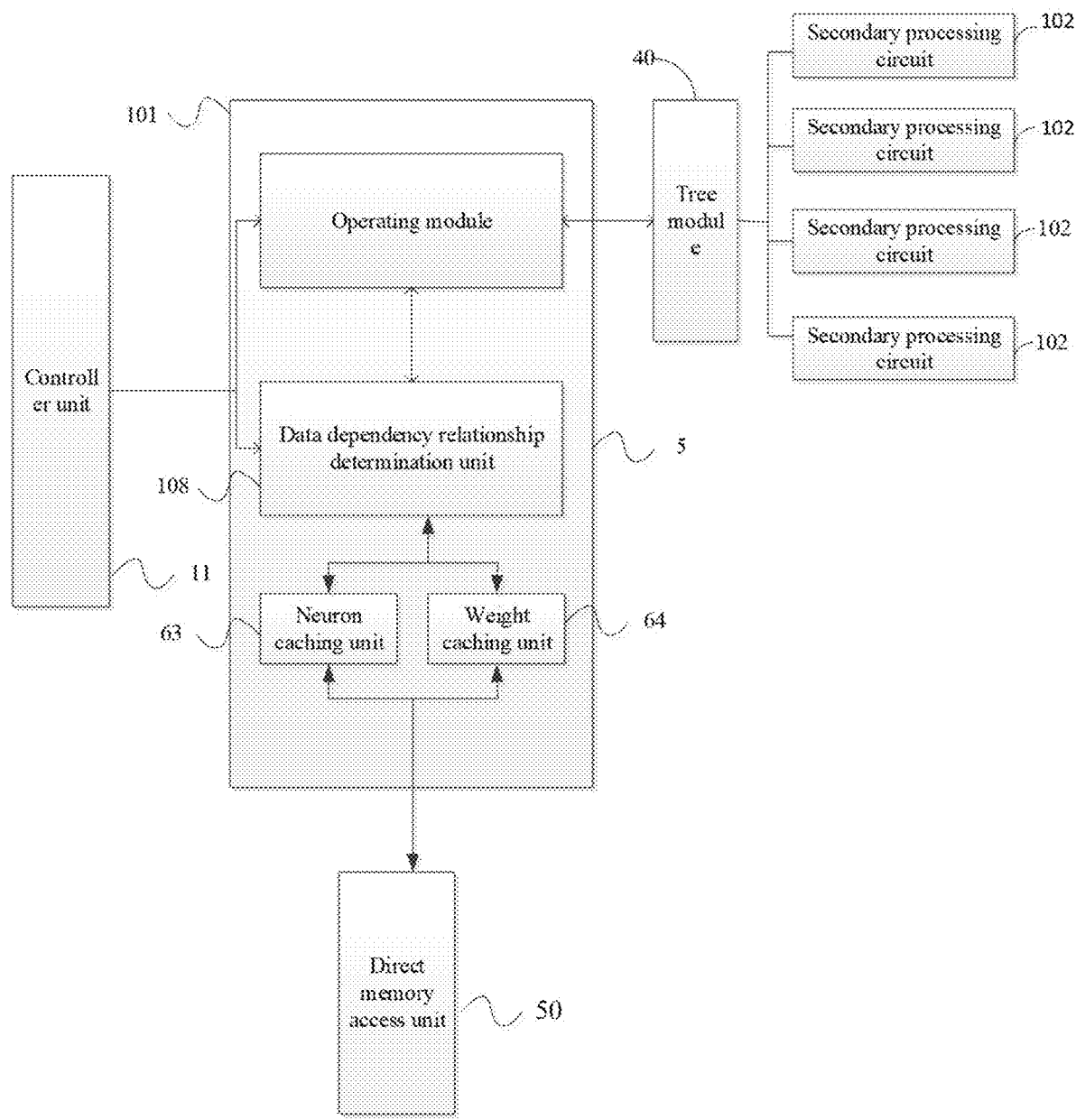
FIG. 5H is a structural diagram of still another computation device according to one example of the present disclosure.

As shown in FIG. 5H, the operation unit may further include a weight caching unit 64 configured to cache weight data required by the secondary processing circuit in the computation process.

In an example, as shown in FIG. 5B, the operation unit 12 may include a branch processing circuit 103, and a specific connection structure of the branch processing circuit 103 is shown in FIG. 5B, where the primary processing circuit 101 may be connected with the branch processing circuit 103 (one or more), and the branch processing circuit 103 is connected to one or more secondary processing circuits 102; and the branch processing circuit 103 may be configured to execute data or instructions among the primary processing circuit 101 and the secondary processing circuit 102.

In an example, a fully connected operation in the neural network operation is described as an example. The operation process may be expressed as y=f(wx+b), where x is an input neuron matrix, w is a weight matrix, b is a bias scalar, and f is an activation function. The activation function f may be one of sigmoid function, tan h function, relu function, and softmax function. In this example, assuming a binary tree structure with 8 secondary processing circuits 102 is provided, the implementation may be as follows:

obtaining, by the controller unit, the input neuron matrix x, the weight matrix w, and a fully connected operation instruction from the storage unit; and sending, by the controller unit, the input neuron matrix x, the weight matrix w, and the fully connected operation instruction to the primary processing circuit;

determining, by the primary processing circuit, the input neuron matrix x and the weight matrix w to be broadcast data and distribution data respectively; dividing, by the primary processing circuit, the weight neuron matrix w into eight sub-matrices; distributing, by the primary processing circuit, the eight sub-matrices to the eight secondary processing circuits through the tree module; and broadcasting, by the primary processing circuit, the input neuron matrix x to the eight secondary processing circuits;

performing, by the secondary processing circuit, multiplication and accumulation operations of the eight sub-matrices and the input neuron matrix x in parallel to obtain eight intermediate results; and sending, by the secondary processing circuit, the eight intermediate results to the primary processing circuit; and ranking, by the primary processing circuit, eight intermediate results to obtain an operation result of wx; performing, by the primary processing circuit, a bias b operation on the operation result; performing, by the primary processing circuit, an activation operation to obtain a final result y and sending the final result y to the controller unit; and outputting or storing, by the controller unit, the final result y into the storage unit.

The method for performing the neural network forward operation instruction by the computation device is illustrated in FIG. 5A, which may include:

extracting, by the controller unit, a neural network forward operation instruction, and an opcode field and at least one opcode corresponding to the neural network operation instruction from the instruction caching unit; sending, by the controller unit, the opcode field to a data access unit; and sending, by the controller unit, the at least one opcode to the operation unit.

The controller unit extracts a weight w and a bias b corresponding to the opcode field from the storage unit (if b is zero, the bias b does not need to be extracted). The weight w and the bias b are sent to the primary processing circuit of the operation unit, and the controller unit extracts input data Xi from the storage unit, and sends the input data Xi to the primary processing circuit.

The primary processing circuit determines a multiplication operation according of the at least one opcode, determines the input data Xi to be broadcast data, determines the weight data to be distribution data, and divides the weight w into n data blocks.

The instruction processing unit of the controller unit determines a multiplication instruction, a bias instruction, and an accumulation instruction according to the at least one opcode, and sends the multiplication instruction, the bias instruction, and the accumulation instruction to the primary processing circuit. The primary processing circuit broadcasts the multiplication instruction and the input data Xi to the multiple secondary processing circuits, and distributes the n data blocks to the multiple secondary processing circuits (for instance, if there are n secondary processing circuits, each secondary processing circuit is distributed with one data block). The multiple secondary processing circuits may be configured to perform a multiplication operation on the input data Xi and received data blocks to obtain intermediate results according to the multiplication instruction, and send the intermediate results to the primary processing circuit. The primary processing circuit performs an accumulation operation on the intermediate results sent by the multiple secondary processing circuits to obtain an accumulation result according to the accumulation instruction, performs an addition operation on the accumulation result and the bias b to obtain a final result according to the bias instruction, and sends the final result to the controller unit.

In addition, an order of the addition operation and the multiplication operation may be reversed.

The technical solution provided by the present disclosure may implement a multiplication operation and a bias operation of a neural network through an instruction (a neural network operation instruction), and intermediate results obtained by the neural network operation may not need to be stored or extracted, which may reduce the storage and extraction operations of intermediate data. Therefore, the technical solution provided by the present disclosure may reduce corresponding operational steps and improve the computational effect of the neural network.

A machine learning operation device may be further provided. The machine learning operation device may include one or more computation devices mentioned in the present disclosure for obtaining data to be processed and control information from other processing devices, performing specified machine learning computations, and sending execution results to peripheral devices through I/O interfaces. The peripherals include cameras, monitors, mice, keyboards, network cards, WIFI interfaces, servers, and the like. If multiple computation devices are provided, the computation devices may link and transfer data with each other through a specific structure. For instance, data may be interconnected and transferred via a PCIE bus, so as to support larger scale machine learning computations. In this case, the multiple computation devices may share the same control system, or have separate control systems. Further, the multiple computation devices may share the same memory, or each accelerator may have separate memories. In addition, the interconnection method may be any interconnection topology.

The machine learning operation device may have high compatibility and may be connected with various types of servers through the PCIE interface.

The present disclosure also discloses a combined processing device, which may include the machine learning operation device, a universal interconnection interface, and other processing devices. The machine learning operation device interacts with other processing devices to perform user-specified operations. FIG. 6A is a schematic diagram of the combined processing device.

The other processing devices may include at least one of general purpose/dedicated processors such as a central processing unit (CPU), a graphics processing unit (GPU), a machine learning processor, and the like. The number of processors included in other processing devices is not limited. The other processing devices, served as an interface between the machine learning operation device and external data or control, may include data handling and perform basic control of start and stop operations of the machine learning operation device. The other processing devices may also cooperate with the machine learning operation device to complete a computing task.

The universal interconnection interfaces may be configured to transfer data and control instructions between the machine learning operation device and the other processing devices. The machine learning operation device may obtain input data required from the other processing devices, and write the input data required into on-chip storage devices of the machine learning operation device; may obtain control instructions from the other processing devices, and write the control instructions into on-chip control caches of the machine learning operation device; or may read data in the storage module of the machine learning operation device and transfer the data to the other processing devices.

Figure 7A:
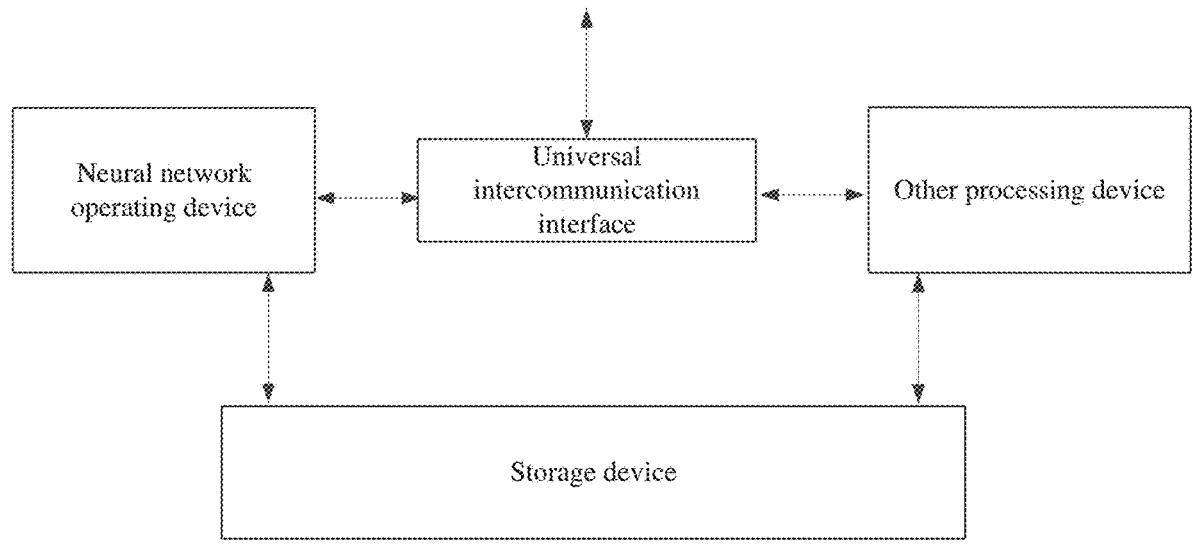
FIG. 7A is a structural diagram of another combined processing device according to one example of the present disclosure.

In an example, a structure of another combined processing device is as illustrated in FIG. 7A. A storage device may be further provided, and be connected with the machine learning operation device and the other processing device respectively. The storage device may be configured to store data in the machine learning operation device and the other processing devices, and be particularly suitable for storing data to be processed which may not be completely stored in the internal storage of the machine learning operation device or the other processing devices.

The combined processing device may be used as an SOC on-chip system of devices such as mobile phones, robots, drones, video monitoring devices, etc., which may effectively reduce a core area of control parts, increase processing speed, and reduce overall power consumption. In this case, the universal interconnection interfaces of the combined processing device are connected with certain components of the device. The components may include cameras, monitors, mice, keyboards, network cards, and WIFI interfaces.

In some examples, a chip may be provided, which may include the machine learning operation device or the combined processing device.

In some examples, a chip package structure may be provided, which may include the chip.

Figure 7B:
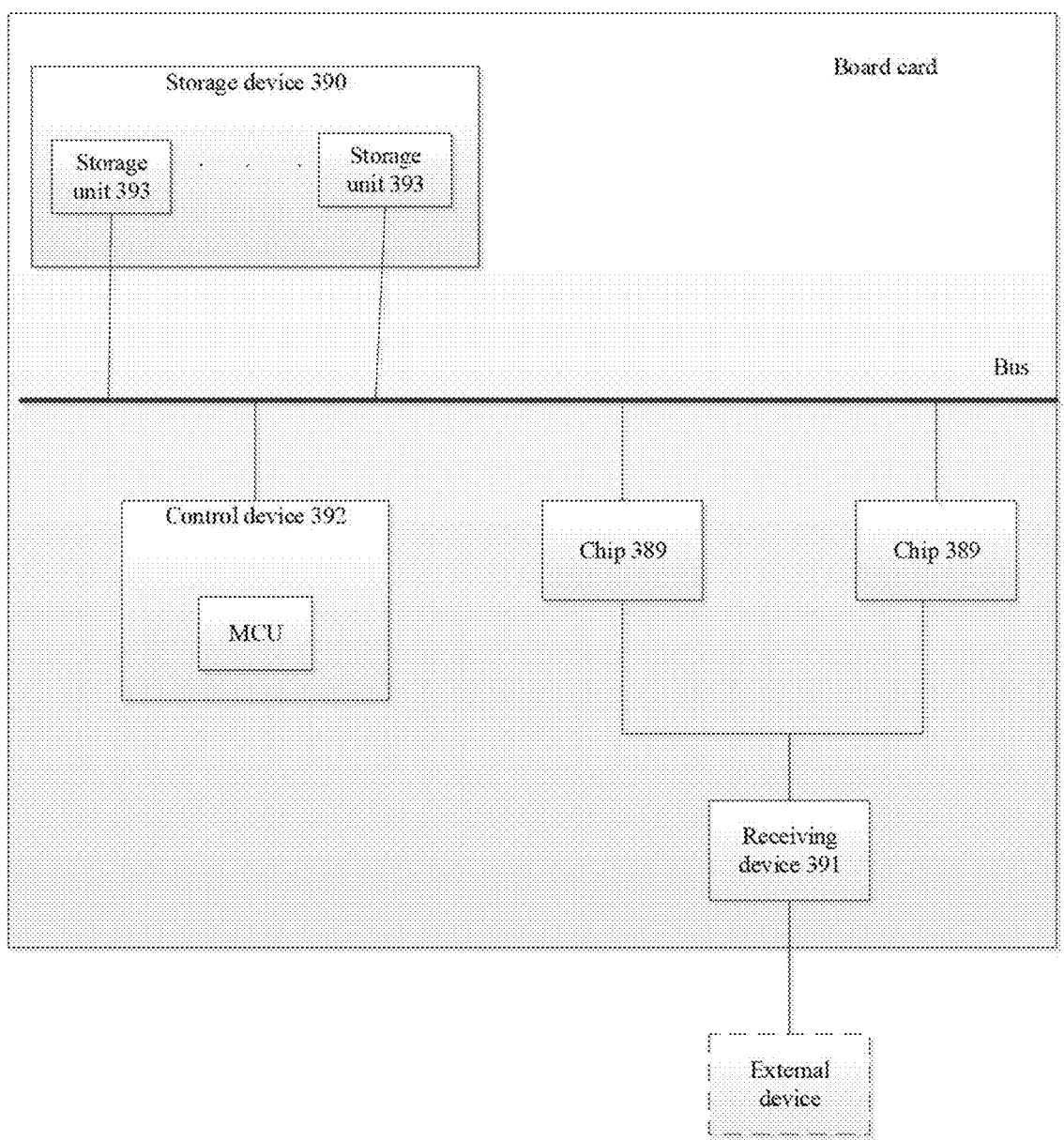
FIG. 7B is a structural diagram of a board card according to one example of the present disclosure.

In some examples, a board card is provided, which may include the chip package structure. Referring to FIG. 7B, a board card is provided. In addition to the chip 389, the board card may also include other supporting components which includes, but not limited to, a storage device 390, a receiving device 391, and a control device 392.

The memory device 390 is connected with the chip in the chip package structure via a bus for storing data. The memory device may include multiple sets of storage units 393. Each set of the storage units 393 is connected with the chip via the bus. It may be understood that each set of the storage units 393 may be a double data rate synchronous dynamic random access memory (DDR SDRAM).

The double data rate (DDR) is capable to double the speed of SDRAM without increasing the clock frequency. The DDR allows data to be read on rising and falling edges of the clock pulse. The DDR is twice as fast as the standard SDRAM. In an example, the storage device may include four sets of the storage units. Each set of the storage units may include multiple DDR4 particles (chips). In an example, the chip may internally include four 72-bit DDR4 controllers. 64 bits of the 72-bit DDR4 controller are used for data transfer, and 8 bits of the 72-bit DDR4 controller are used for error checking and correcting (ECC) verification. It should be understood that if DDR4-3200 particles are used in each set of the storage units, a theoretical bandwidth of data transfer may reach 25600 MB/s.

In an example, each set of the storage units may include multiple double rate synchronous dynamic random access memories arranged in parallel. The DDR may transfer data twice in one clock cycle. A controller for controlling the DDR is provided in the chip for controlling data transfer and data storage for each of the storage units.

The interface device is electrically connected with the chip within the chip package structure. The interface device may be configured to implement data transfer between the chip and external devices such as a server and a computer. For instance, in an example, the interface device may be a standard PCIE interface. For instance, the data to be processed is transmitted to the chip by the server through a standard PCIE interface to implement data transfer. Preferably, if the data to be processed is transmitted over the PCIE 3.0×16 interface, a theoretical bandwidth may reach 16000 MB/s. In another example, the interface device may also be another interface. The disclosure does not limit a specific representation of the other interfaces, and an interface unit capable of implementing the transfer function will be available. In addition, the computation result of the chip is still sent by the interface device back to the external devices (such as a server).

The control device is electrically connected with the chip. The control device may be configured to monitor the state of the chip. Specifically, the chip may be electrically connected with the control device through an SPI interface. The control device may include a micro controller unit (MCU). For instance, the chip may include multiple processing chips, multiple processing cores, or multiple processing circuits, and multiple loads may be driven. Therefore, the chip may be in different operating states such as multiple loads and light loads. The control device may control the operating states of the multiple processing chips, the multiple processing cores, and/or the multiple processing circuits in the chip.

In some examples, an electronic device is provided, which may include the board card.

Figure 8:
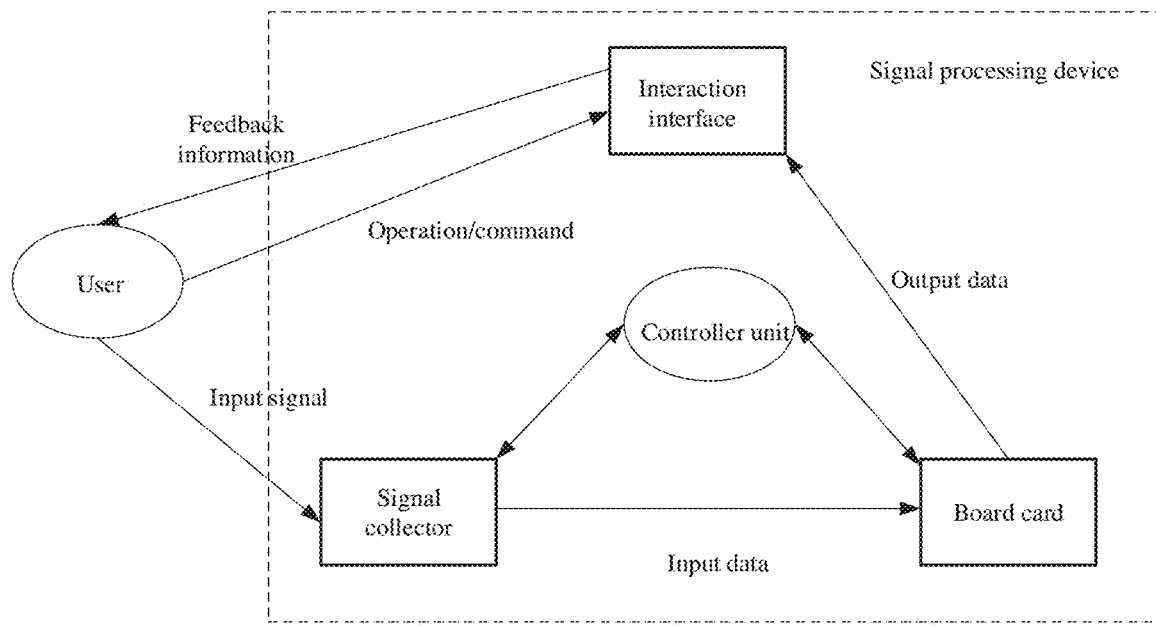
FIG. 8 is a structural diagram of an electronic device according to one example of the present disclosure.

As shown in FIG. 8, a voice collector may be configured to receive a signal, and then transfer the voice and an image to be processed to a chip inside a board card as input data.

Optionally, the image processing chip may be an artificial neural network processing chip.

Optionally, the voice collector may be a microphone or a multi-array microphone.

The chip inside the board card including the above examples may be configured to obtain corresponding output data (processed images) and transfer the corresponding output data to an interactive interface.

The interactive interface may be configured to receive output data of the chip (which can be regarded as an artificial neural network processor) and convert the output data into a suitable form of feedback information to display to users.

The control unit may be configured to receive users' operations or commands and control the operation of the whole image processing device.

Optionally, the electronic device may be a data processing device, a robot, a computer, a tablet, an intelligent terminal, a mobile phone, a cloud server, a camera, a video camera, a projector, a watch, an earphone, a mobile storage, or a wearable device.

Figure 9:
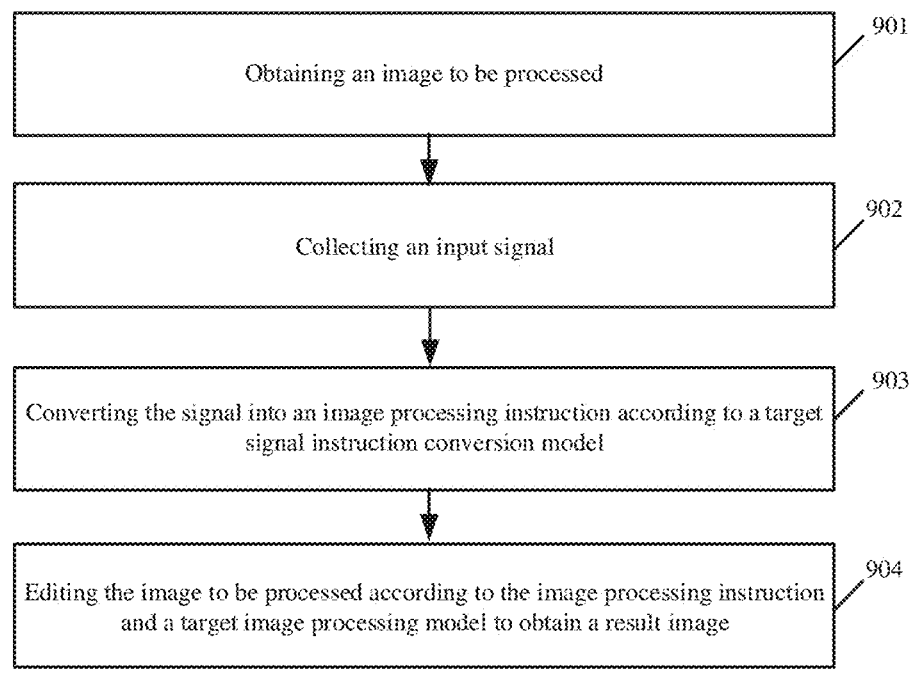
FIG. 9 is a flow chart of a signal processing method according to one example of the present disclosure.

FIG. 9 is a flow chart of a signal processing method according to one example of the present disclosure. The method includes:
a step 901: obtaining an image to be processed;
a step 902: collecting an input signal;
a step 903: converting the signal into an image processing instruction according to a target signal instruction conversion model; and
a step 904: editing the image to be processed according to the image processing instruction and the target image processing model to obtain a result image.

In an example, the image processing instruction may include at least one of the following: an image editing area, an image editing method, and an image editing mode, where the image editing mode is a real-time editing mode, or a single-image editing mode, or a multiple-image editing mode.

In an example, the image to be processed refers to content that is captured in real time by an image obtaining device, or refers to at least one frame of an image or a video stored from a memory.

In an example, the step 903 of converting the signal into an image processing instruction according to the target signal instruction conversion model may include the following steps:
converting the signal into text information through a signal recognition technology, where the signal recognition technology is at least one of the following: a voice recognition technology, a semantic understanding technology, an image recognition technology, and a natural language processing technology;
converting the text information into the image editing method through the natural language processing technology and the target signal instruction conversion model; and
dividing the image to be processed into areas according to a granularity of the semantic area in the image processing instruction and the image recognition technology to obtain the image editing area.

In an example, the step 903 of converting the signal into an image processing instruction according to the target signal instruction conversion model may include the following steps:
converting, by the second signal recognizer, the signal into the image editing method according to the signal recognition technology and the target signal instruction conversion model; and
dividing, by the second image recognizer, the image to be processed according to the granularity of the semantic area of the image to be processed according to the image processing instruction to obtain the image editing area.

In an example, the step of editing the image to be processed according to the image processing instruction and the target image processing model to obtain a result image may include the following steps:
obtaining M image processing instructions from the storage device in a preset time window; and
processing the image editing area according to the M image processing instructions and the target image processing model.

In an example, the step of processing the image editing area according to the M image processing instructions and the target image processing model may include the following steps:
deleting image processing instructions with identical functions in the M image processing instructions to obtain N image processing instructions, where M is an integer greater than one, and N is an integer smaller than the M; and
processing the image editing area according to the N image processing instructions and the target image processing model.

It should be noted that the implementation process of each step in the method of FIG. 9 will not be further described here. For the details, please refer to the specific implementation process of the signal processing device.

Figure 10:
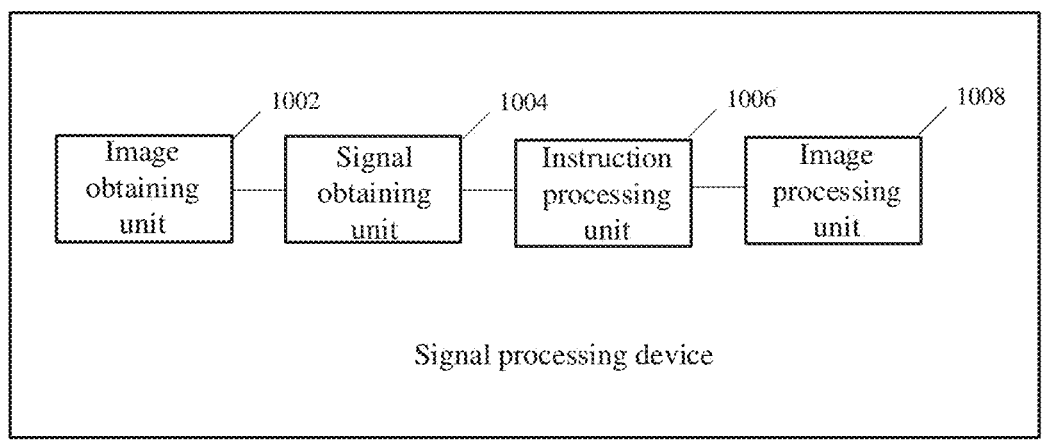
FIG. 10 is a structural diagram of another signal processing device according to one example of the present disclosure.

FIG. 10 is a schematic structural diagram of a signal processing device according to one example of the present disclosure. The signal processing device is applied to an electronic device, and may include an image obtaining unit 1002, a signal obtaining unit 1004, an instruction processing unit 1006, and an image processing unit 1008, where:
the image obtaining unit 1002 may be configured to obtain an image to be processed;
the signal obtaining unit 1004 may be configured to collect an input signal;
the instruction processing unit 1006 may be configured to convert the signal into an image processing instruction according to a target signal instruction conversion model; and
the image processing unit 1008 may be configured to edit the image to be processed according to the image processing instruction and the target image processing model to obtain a result image.

The signal obtaining unit 1004 may be configured to obtain a signal, and may further include one or any combination of a voice signal obtaining unit, a touch signal obtaining unit, an image signal obtaining unit, and an action signal obtaining unit, etc., which is not limited herein.

The instruction processing unit 1006 may be configured to convert a signal into an instruction, and may further include one or more of a voice signal processing unit, a touch signal processing unit, an image signal processing unit, and a motion signal processing unit, etc.

The image processing unit 1008 may be configured to edit an input image according to a processed instruction. The input image may be an image or a video frame that is read and sent in from another storage unit such as an album, or an image or a video frame that is obtained by the image obtaining unit in real time.

An image displaying unit (not shown in the figure) may be configured to display an image in real time, and display an image or a video frame before or after editing in real time.

The image obtaining unit 1002 may be configured to obtain an image or a video frame in real time. This unit may be a camera of an electronic device and may capture an image captured by an image device in real time. The image may be captured during framing, photographing, video recording, and the like.

It can be understood that functions of each program module of the signal processing device in the example may be specifically implemented according to the methods in the above method examples. The specific implementation process will not be further described here. For details, please refer to related description of the above method examples.

Figure 11:
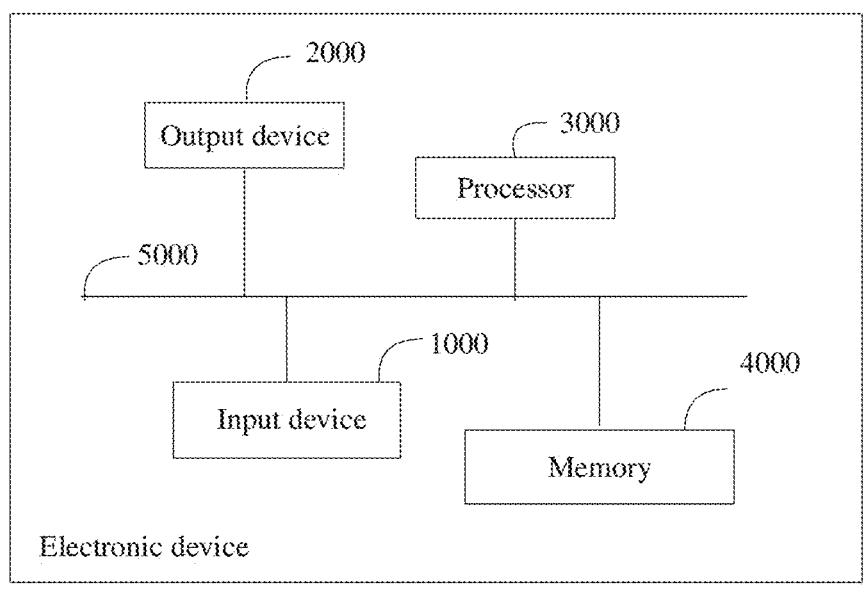
FIG. 11 is a structural diagram of another electronic device according to one example of the present disclosure.

FIG. 11 is a schematic structural diagram of an electronic device according to one example of the present disclosure. The electronic device described in the example includes: at least one input device 1000; at least one output device 2000; at least one processor 3000 such as a central processing unit CPU, a graphics processing unit GPU, an embedded neural network processing Unit (NPU), or an AI chip; and a memory 4000. The above input device 1000, the output device 2000, the processor 3000, and the memory 4000 are connected through a bus 5000.

The input device 1000 may specifically be a touch screen, a physical button, or a mouse.

The output device 2000 may specifically be a display screen.

The memory 4000 may be a high-speed RAM memory or a non-volatile memory such as a magnetic disk memory. The memory 4000 may be configured to store a set of program codes. The input device 1000, the output device 2000, and the processor 3000 may be configured to call the program codes stored in the memory 4000 to perform the following operations:

obtaining an image to be processed;

collecting an input signal;

converting the signal into an image processing instruction according to a target signal instruction conversion model; and editing the image to be processed according to the image processing instruction and the target image processing model to obtain a result image.

In an example, the image processing instruction may include at least one of the following: an image editing area, an image editing method, and an image editing mode, where the image editing mode is a real-time editing mode, or a single-image editing mode, or a multiple-image editing mode.

In an example the image to be processed refers to content that is captured in real time by an image obtaining device, or refers to at least one frame of an image or a video stored from a memory.

In an example, in the aspect of converting the signal into an image processing instruction according to the target signal instruction conversion model, the processor 3000 may be specifically configured to:

convert the signal into text information through a signal recognition technology, where the signal recognition technology is at least one of the following: a voice recognition technology, a semantic understanding technology, an image recognition technology, and a natural language processing technology;

convert the text information into the image editing method through the natural language processing technology and the target signal instruction conversion model; and divide the image to be processed into areas according to a granularity of the semantic area in the image processing instruction and the image recognition technology to obtain the image editing area.

In an example, in the aspect of converting the signal into an image processing instruction according to the target signal instruction conversion model, the processor 3000 may specifically include:

the second signal recognizer configured to convert the signal into the image editing method according to the signal recognition technology and the target signal instruction conversion model; and the second image recognizer configured to divide the image to be processed according to the granularity of the semantic area of the image to be processed according to the image processing instruction to obtain the image editing area.

In an example, in the aspect of editing the image to be processed according to the image processing instruction and the target image processing model to obtain a result image, the processor 3000 may be specifically configured to:

obtain M image processing instructions from the storage device in a preset time window; and process the image editing area according to the M image processing instructions and the target image processing model.

In an example, in the aspect of processing the image editing area according to the M image processing instructions and the target image processing model, the processor 3000 may be specifically configured to:

delete image processing instructions with identical functions in the M image processing instructions to obtain N image processing instructions, where M is an integer greater than one, and N is an integer smaller than the M; and process the image editing area according to the N image processing instructions and the target image processing model.

The processor may be configured to obtain at least one type of instruction information, process instruction information, process an input image or video frame according to the instruction information, and perform real-time processing on subsequent video frames or captured images according to the instruction information.

It should be noted that corresponding descriptions of each device in the electronic device in the examples of present disclosure will not be further described here. For the details, please refer to the corresponding descriptions in FIG. 1.

Examples of the present disclosure provide a computer readable storage medium, on which a computer program for electronic data exchange is stored. The computer program enables a computer to execute some or all of the steps described in the above method examples. The computer may include an electronic device.

Examples of the present disclosure further provide a computer program product, which includes a non-volatile computer readable storage medium storing a computer program. The computer program enables a computer to execute some or all of the steps described in the above method examples. The computer program product may be a software installation package. The computer may include an electronic device.

It should be noted that, for the simplicity of descriptions, all the above method examples are described as a series of action combinations. However, those skilled in the art should know that the present disclosure is not limited to the described order of actions, because according to the present disclosure, certain steps may be performed in another order or performed at the same time. Moreover, those skilled in the art should also be aware that the examples described in the specification are alternative examples and that the actions and modules involved are not necessary in the present disclosure.

In the examples, the description of each example has different emphasis. For the parts not described in detail in an example, please refer to related descriptions in other examples.

In the examples of the disclosure, it should be understood that the device disclosed may be implemented in other manners. For instance, the described device examples are merely illustrative; for instance, division of the unit is only a logical function division and can be divided in other manners during actual implementations, for instance, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units, that is, the units or the components may be in the same place or may be distributed to a plurality of network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above-mentioned integrated unit can be implemented in the form of hardware.

The examples of the present disclosure are described in detail above and specific examples are used herein to describe the principle and implementation manners of the present disclosure. The description of the above examples is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A signal processing device, comprising:
   a signal collector configured to obtain an image to be processed and collect an input signal;
   a memory for storing the image to be processed;
   an instruction converter configured to convert the signal into an image processing instruction according to a target signal instruction conversion model; and
   an image processor configured to edit the image to be processed according to the image processing instruction and a target image processing model to obtain a result image;
   wherein the target signal instruction conversion model is obtained by implementing adaptive training on a signal instruction conversion model, and wherein the target image processing model is obtained by implementing adaptive training on an image processing model and is customized according to user behavior.

2. The signal processing device of claim 1, wherein the image processing instruction includes at least one of the following: an image editing area, an image editing method, and an image editing mode, wherein the image editing mode is a real-time editing mode, or a single image editing mode, or a multi-image editing mode.

3. The signal processing device of claim 1, wherein the image to be processed comprises content that is captured in real time by an image collecting device, or comprises at least one frame of an image or a video stored in the memory.

4. The signal processing device of claim 2, wherein the instruction converter includes:
   a first signal recognizer configured to convert the signal into text information through a signal recognition technology, wherein the signal recognition technology is at least one of the following: a voice recognition technology, a semantic understanding technology, an image recognition technology, and a natural language processing technology,
   a signal text converter configured to convert the text information into an image processing method through the natural language processing technology and the target signal instruction conversion model, and
   a first image recognizer configured to divide the image to be processed into areas according to a granularity of a semantic area in the image processing instruction and the image recognition technology to obtain an image editing area.

5. The signal processing device of claim 2, wherein the instruction converter includes:
   a second signal recognizer configured to convert the signal into the image editing method according to the signal recognition technology and the target signal instruction conversion model, and
   a second image recognizer configured to divide the image to be processed into areas according to a granularity of the semantic area in the image processing instruction and the image recognition technology to obtain the image editing area.

6. The signal processing device of claim 3, wherein the image processor includes:
   an instruction fetching module configured to obtain an image processing instruction in a preset time window, and
   a processing module configured to process the image editing area according to the image processing instruction and the target image processing model.

7. The signal processing device of claim 1, wherein the signal includes at least one of the following: a voice signal, an image signal, a text signal, and a sensor signal.

8. The signal processing device of claim 1, wherein the target signal instruction conversion model is obtained by implementing adaptive training on a signal instruction conversion model, and wherein the target image processing model is obtained by implementing adaptive training on an image processing model.

9. The signal processing device of claim 1, wherein the instruction converter is configured to:
   convert the signal into a prediction instruction according to the signal instruction conversion model,
   determine a correlation coefficient between the prediction instruction and a corresponding instruction set of the prediction instruction, and
   optimize the signal instruction conversion model according to the correlation coefficient between the prediction instruction and the corresponding instruction set of the prediction instruction to obtain the target signal instruction conversion model.

10. The signal processing device of claim 1, further comprising a trainer configured to:
    convert the signal into the prediction instruction according to the instruction conversion model,
    determine the correlation coefficient between the prediction instruction and the corresponding instruction set of the prediction instruction,
    optimize the signal instruction conversion model according to the correlation coefficient between the prediction instruction and the corresponding instruction set of the prediction instruction to obtain the target signal instruction conversion model;
    process the image to be processed according to the image processing model to obtain a predicted image,
    determine a correlation coefficient between the predicted image and a corresponding target image of the predicted image, and
    optimize the image processing model according to the correlation coefficient between the predicted image and the corresponding target image of the predicted image to obtain the target image processing model.

11. The signal processing device of claim 1, wherein the image processor is further configured to:
- process the image to be processed according to the image processing model to obtain a predicted image,
- determine a correlation coefficient between the predicted image and a corresponding target image of the predicted image, and
- optimize the image processing model according to the correlation coefficient between the predicted image and the corresponding target image of the predicted image to obtain the target image processing model.

12. The signal processing device of claim 1, wherein the signal processing device is configured to:
- convert the voice signal into the prediction instruction according to the signal instruction conversion model,
- determine the correlation coefficient between the prediction instruction and the corresponding instruction set of the prediction instruction, and
- optimize the signal instruction conversion model according to the correlation coefficient between the prediction instruction and the corresponding instruction set of the prediction instruction to obtain the target signal instruction conversion model.

13. The signal processing device of claim 1, wherein the signal processing device is configured to:
- process the image to be processed according to the image processing model to obtain a predicted image,
- determine the correlation coefficient between the predicted image and the corresponding target image of the predicted image, and
- optimize the image processing model according to the correlation coefficient between the predicted image and the corresponding target image to obtain the target image processing model.

14. A machine learning operation device, comprising one or more signal processing devices of claim 1, wherein the machine learning operation device is configured to obtain data to be processed and control information from other processing devices, perform specified machine learning computations, and send execution results to peripheral devices through I/O interfaces;
- if the machine learning operation device includes multiple signal processing devices, the multiple signal processing devices transfer data between each other;
- wherein the data is transferred among the multiple signal processing devices via a PCIE bus, so as to support larger scale machine learning computations; the multiple signal processing devices share one control system or have separate control systems.

15. A neural network chip, comprising the machine learning operation device of claim 14.

16. A signal processing method, comprising
obtaining an image to be processed;
collecting an input signal;
converting the signal into an image processing instruction according to a target signal instruction conversion model; and
editing the image to be processed according to the image processing instruction and a target image processing model to obtain a result image;
wherein the target signal instruction conversion model is obtained by implementing adaptive training on a signal instruction conversion model, and wherein the target image processing model is obtained by implementing adaptive training on an image processing model and is customized according to user behavior.

17. The method of claim 16, wherein the image processing instruction includes at least one of the following: an image editing area, an image editing method, and an image editing mode, wherein the image editing mode is a real-time editing mode, or a single-image editing mode, or a multiple-image editing mode.

18. The method of claim 16, wherein the image to be processed comprises content that is captured in real time by an image obtaining device, or comprises at least one frame of an image or a video stored from a memory or a cache.

19. The method of claim 16, wherein the converting the signal into an image processing instruction according to the target signal instruction conversion model includes:
- converting the signal into text information through a signal recognition technology, wherein the signal recognition technology is at least one of the following: a voice recognition technology, a semantic understanding technology, an image recognition technology, and a natural language processing technology,
- converting the text information into the image editing method through the natural language processing technology and the target signal instruction conversion model, and
- dividing the image to be processed into areas according to a granularity of the semantic area in the image processing instruction and the image recognition technology to obtain an image editing area.

20. The method of claim 17, wherein the converting the signal into an image processing instruction according to the target signal instruction conversion model includes:
- converting, by a second signal recognizer, the signal into the image editing method according to the signal recognition technology and the target signal instruction conversion model, and
- dividing, by a second image recognizer, the image to be processed into areas according to a granularity of the semantic area of the image to be processed and the image processing instruction to obtain the image editing area.

21. The method of claim 18, wherein the editing the image to be processed according to the image processing instruction and the target image processing model to obtain a result image includes:
- obtaining an image processing instruction in a preset time window, and
- processing the image editing area according to the image processing instructions and the target image processing model.

22. The method of claim 16, wherein the signal includes at least one of the following: a voice signal, an image signal, a text signal, and a sensor signal.

* * * * *